(12) United States Patent
Daraio et al.

(10) Patent No.: US 9,616,635 B2
(45) Date of Patent: Apr. 11, 2017

(54) MULTILAYER FOAM STRUCTURES OF NOMINALLY-ALIGNED CARBON NANOTUBES (CNTS)

(71) Applicant: CALIFORNIA INSTITUTE OF TECHNOLOGY, Pasadena, CA (US)

(72) Inventors: Chiara Daraio, Pasadena, CA (US); Abha Misra, Bangalore (IN); Jordan R. Raney, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 826 days.

(21) Appl. No.: 13/866,596

(22) Filed: Apr. 19, 2013

(65) Prior Publication Data

US 2013/0280515 A1    Oct. 24, 2013

Related U.S. Application Data

(60) Provisional application No. 61/636,498, filed on Apr. 20, 2012.

(51) Int. Cl.
*B32B 3/10* (2006.01)
*B32B 27/06* (2006.01)
(Continued)

(52) U.S. Cl.
CPC .............. *B32B 3/10* (2013.01); *B32B 7/12* (2013.01); *B32B 15/04* (2013.01); *B32B 15/043* (2013.01);
(Continued)

(58) Field of Classification Search
CPC ............ C01B 2202/24; C01B 2202/26; C01B 2202/28; C01B 2202/30; C01B 2202/32; C01B 2202/34; C01B 2202/36; B82Y 5/00; B82Y 10/00; B82Y 15/00; B82Y 20/00; B82Y 25/00; B82Y 30/00; B82Y 35/00; B82Y 40/00; B82Y 99/00; D01F 9/10; B32B 3/10; B32B 27/06; B32B 15/04; B32B 7/12; B32B 15/043; B32B 15/20; B32B 27/08; B32B 2250/40; B32B 2250/42; B32B 2255/06; B32B 2255/10; B32B 2255/20;
(Continued)

(56) References Cited

U.S. PATENT DOCUMENTS 3,328,124 A    6/1967  Mays et al.
6,872,403 B2   3/2005  Pienkowski et al.
(Continued)

FOREIGN PATENT DOCUMENTS

WO    2011/143777    11/2011

OTHER PUBLICATIONS

Myung Gwan Hahm, Bundling dynamics regulates the active mechanics and transport in carbon nanotube networks, Aug. 9, 2011.*

(Continued)

*Primary Examiner* — Jacob T Minskey
*Assistant Examiner* — Vishal I Patel
(74) *Attorney, Agent, or Firm* — Steinfl + Bruno LLP

(57) ABSTRACT

A method for making a multilayer foam structure of nominally-aligned carbon nanotubes (CNTs) is disclosed. The method comprises synthesizing a layer of CNTs and sandwiching the layer of CNTs between two polymeric layers, or between two metallic layers or foils.

10 Claims, 20 Drawing Sheets

(51) Int. Cl.
| | |
|---|---|
| B32B 15/04 | (2006.01) |
| B32B 7/12 | (2006.01) |
| B32B 15/20 | (2006.01) |
| B32B 27/08 | (2006.01) |
| B32B 27/28 | (2006.01) |

(52) U.S. Cl.
CPC .............. *B32B 15/20* (2013.01); *B32B 27/06* (2013.01); *B32B 27/08* (2013.01); *B32B 27/283* (2013.01); *B32B 2250/40* (2013.01); *B32B 2250/42* (2013.01); *B32B 2255/06* (2013.01); *B32B 2255/10* (2013.01); *B32B 2255/20* (2013.01); *B32B 2255/28* (2013.01); *B32B 2307/202* (2013.01); *B32B 2307/50* (2013.01); *B32B 2307/56* (2013.01); *B32B 2307/72* (2013.01); *Y10T 428/249927* (2015.04); *Y10T 428/249945* (2015.04)

(58) Field of Classification Search
CPC ............ B32B 2255/28; B32B 2307/50; B32B 2307/56; B32B 2307/72; B32B 27/283; B32B 2307/202; Y10T 428/249927; Y10T 428/249945
See application file for complete search history.

(56) References Cited

U.S. PATENT DOCUMENTS

| | | |
|---|---|---|
| 7,204,970 B2 | 4/2007 | Smalley et al. |
| 7,727,624 B2 | 6/2010 | Cao et al. |
| 9,045,343 B2 | 6/2015 | Raney et al. |
| 2002/0102193 A1 | 8/2002 | Smalley et al. |
| 2006/0073089 A1 | 4/2006 | Ajayan et al. |
| 2009/0200912 A1 | 8/2009 | Ren et al. |
| 2009/0208403 A1 | 8/2009 | Hussain et al. |
| 2009/0208708 A1 | 8/2009 | Wei et al. |
| 2009/0278114 A1 | 11/2009 | Grill et al. |
| 2010/0029063 A1 | 2/2010 | Gambin |
| 2010/0083489 A1 | 4/2010 | Eldridge et al. |
| 2010/0187484 A1 | 7/2010 | Worsley et al. |
| 2010/0227058 A1 | 9/2010 | Zhang et al. |
| 2011/0133031 A1 | 6/2011 | Shah et al. |
| 2011/0255212 A1 | 10/2011 | Liu et al. |

OTHER PUBLICATIONS

Abbaslou R.M., et al. "The effects of carbon concentration in the precursor gas on the quality and quantity of carbon nanotubes synthesized by CVD method." Applied Catalysis A: General 2010; 372(2):147-52.
Abot J.L., et al. "On the mechanical response of carbon nanotube array laminated composite materials." Journal of Reinforced Plastics & Composites 2010; 29(22):3401-10.
Ajdari, A., et al. "Dynamic Crushing and Energy Absorption of Regular, Irregular and Functionally Graded Cellular Structures." Int. J. Solids Struct. 2011, 48, 506-516.
Ajayan, P. M. et al. Single-Walled Carbon Nanotube-Polymer Composites: Strength and Weakness. Adv. Mater. 2000, 12, 750-753.
Aksak M, et al. "Carbon nanotube diameter tuning using hydrogen amount and temperature on SiO2/Si substrates." Applied Physics A: Materials Science & Processing 2010; 100(1):213-22.
Andrews R, et al. "Continuous production of aligned carbon nanotubes: a step closer to commercial realization." Chemical Physics Letters 1999; 303(5-6):467-74.
Antkowiak, A. et al., "Instant fabrication and selection of folded structures using drop impact." *PNAS*, Jun. 28, 2011, vol. 108, No. 26, pp. 10400-10404.
Arnold M.S., et al. "Sorting carbon nanotubes by electronic structure using density differentiation." Nature Nanotechnol. 160-5; 2006.

Barker, M. K., et al. "The Relationship of the Compressive Modulus of Articular Cartilage with its Deformation Response to Cyclic Loading: Does Cartilage Optimize its Modulus so as to Minimize the Strains Arising in it Due to the Prevalent Loading Regime?" Rhumatology 2001, 40, 274-284.
Baughman, R. H., et al. "Carbon Nanotube Actuators." Science 1999, 284, 1340-1344.
Baughman, R.H. et al. "Carbon nanotubes: the route toward applications." Science 2002; 297(5582):787-92.
Bittencourt C, et al. "Decorating Carbon Nanotubes with Nickel Nanoparticles." Chem. Phys. Lett. 2007; 436(4-6):368-72.
Bradford P.D., et al. "Tuning the compressive mechanical properties of carbon nanotube foam." Carbon 2011;49(8):2834-41.
Cao, A., et al. "Macroscopic three dimensional arrays of Fe nanoparticles supported in aligned carbon nanotubes." J. Phys. Chem. B 2001, 105, 11937-11940.
Cao, A., et al. "Super-Compressible Foam Like Carbon Nanotube Films." Science 2005, 310, 1307-1310.
Chakrabarti S, et al. "Number of walls controlled synthesis of millimeter-long vertically aligned brushlike carbon nanotubes." Journal of Physical Chemistry C 2007; 111(5):1929-34.
Chakrapani N., et al. "Capillarity-driven assembly of two-dimensional cellular carbon nanotube foams." Proc. Natl Acad. Sci. 101 4009-12; 2004.
Chandrashekar A, et al. "Forming Carbon Nanotube Composites by Directly Coating Forests with Inorganic Materials Using Low Pressure Chemical Vapor Deposition." Thin Solid Films 2008; 517(2):525-30.
Ci, L. et al. "Continuous Carbon Nanotube Reinforced Composites." Nano Lett. 2008, 8, 2762-2766.
Cui X, et al. "Effect of catalyst particle interspacing on the growth of millimeter-scale carbon nanotube arrays by catalytic chemical vapor deposition." Carbon 2009;47 (15):3441-51.
Cui, L., et al. "Designing the energy absorption capacity of functionally graded foam materials." Materials Science and Engineering A 2009, 507, 215-225.
Daraio, C., et al. "Highly Nonlinear Contact Interaction and Dynamic Energy Dissipation by Forest of Carbon Nanotubes." Appl. Phys. Lett. 2004, 85, 5724-5726.
Deck, C. P., et al. "Growth of well-aligned carbon nanotube structures in successive layers." J. Phys. Chem. B 2005, 109, 12353-12357.
Deck, C.P., et al. "Mechanical behavior of ultralong multiwalled carbon nanotube mats." J. Appl. Phys. 101 023512.
De Falco, I, et al. "A comparative analysis of evolutionary algorithms for function optimization." In: Proceedings of the Second Workshop on Evolutionary Computation (WEC2), Nagoya, Japan; 1996. p. 29-32.
De Heer W.A., et al. "A carbon nanotube field-emission electron source." Science 1995;270 (5239):1179-80.
Dong L, et al. "Effects of hydrogen on the formation of aligned carbon nanotubes by chemical vapor deposition." Journal of Nanoscience and Nanotechnology 2002;2(2):155-60.
Dresselhaus M.S., et al. "Raman spectroscopy of carbon nanotubes." Physics Reports 2005;409 (2):47-99.
Du, M. et al. "Modification of silica nanoparticles and their application in UDMA dental polymeric composites." Polym. Compos. 28 198-207; 2007.
Eder, D. "Carbon Nanotube-Inorganic Hybrids." Chem. Rev. 2010; 110(3):1348-85.
Ellis, V, et al. "Hydrophobic anchoring of monolayer-protected gold nanoclusters to carbon nanotubes." Nano Lett. 3 (3). pp. 279-282. ISSN 1530-6984, 2003.
El Sayed ,T, et al. "A variational constitutive model for soft biological tissue." J Biomech 2008;41:1458-66.
Falvo, M.R., et al. "Bending and Buckling of Carbon Nanotubes Under Large Strain." Nature 1997; 389(6651):582-4.
Feng, X, et al. "Thermal analysis study of the growth kinetics of carbon nanotubes and epitaxial graphene layers on them." Journal of Physical Chemistry C 2009; 113(22):9623-31.
Fraternali, F, et al. "Multiscale mass-spring models of carbon nanotube foams." J Mech Phys Solids 2011;59(1):89-102.

(56) References Cited

OTHER PUBLICATIONS

Fraternali, F, et al. "Optimal design of composite granular protectors." Mech Adv Mater Struct 2010;17(1):1-19.
Gama, B. A., et al. "Aluminum Foam Integral Armor: A New Dimension in Armor Design." Compos. Struct. 2001,52, 381-395.
Garcia, E.J., et al. Fabrication and nanocompression testing of aligned carbon-nanotube-polymer nanocomposites. Adv Mater 2007; 19(16):2151-6.
Gui, X, et al. "Soft, highly conductive nanotube sponges and composites with controlled compressibility." ACS Nano 4 2320-6, 2010.
Guo G, et al. "A Simple Method to Prepare Multi-Walled Carbon Nanotube/ZnO Nanoparticle Composites." Appl. Phys. A. 2007; 89(2):525-8.
Han, C., et al. "Attenuation of Stress Wave Propagation in Periodically Layered Elastic Media." J. Sound Vib. 2001, 243, 747-761.
Han W.Q., et al. "Coating Single-Walled Carbon Nanotubes with Tin Oxide." Nano Lett. 2003; 3(5):681-3.
Holland, J.H., et al. "Outline for a logical theory of adaptive systems." J ACM 1962;9(3):297-314.
Hutchens, S.B., et al. "In situ mechanical testing reveals periodic buckle nucleation and propagation in carbon nanotube bundles." Advanced Functional Materials 2010; 20(14):2338-46.
Iijima, S., et al. "Structural flexibility of carbon nanotube." J. Structural Flexibility of Carbon Nanotubes. J. Chem. Phys. 1996, 104, 2089-2092.
Jackson, J.J., et al. "Pulsed Growth of Vertically Aligned Nanotube Arrays with Variable Density." ACS Nano 2010; 4:7573-7581.
Jin, X, et al. "Nanoscale Microelectrochemical Cells on Carbon Nanotubes." Small 2007; 3(9):1513-7.
Kaur, S. et al. "Capillarity-driven assembly of carbon nanotubes on substrates into dense vertically aligned arrays." Adv. Mater. 192984-7; 2007.
Kiernan, S., et al. "Propagation of a stress wave through a virtual functionally graded foam." International Journal of Non-Linear Mechanics 2009, 44, 456-468.
Kireitseu, M. V. "Vibration Damping Properties of Nanotube-Reinforced Materials." Adv. Sci. Technol. 2006, 50, 31-36.
Kireitseu, M. V., et al. "Damping Properties of Sandwich Metal-Polymer-Ceramic Coating." Mater. Technol.; Ocean Eng. 2007, 4, 21-26.
Kuang Q, et al. "Controllable Fabrication of SnO2-Coated Multiwalled Carbon Nanotubes by Chemical Vapor Deposition." Carbon 2006; 44(7):1166-72.
Lee, C.J., et al. "Temperature effect on the growth of carbon nanotubes using thermal chemical vapor deposition." Chemical Physics Letters 2001; 343(1-2):33-8.
Li, W.Z., et al. "Large-scale synthesis of aligned carbon nanotubes." Science 1996;274(5293):1701-3.
Li Y., et al. "Growth of single-walled carbon nanotubes from discrete catalytic nanoparticles of various sizes." Journal of Physical Chemistry B 2001;105(46):11424-31.
Li, X.; et al. "Bottom-up growth of carbon nanotube multilayers: unprecedented growth." Nano Letters 2005, 5, 1997-2000.
Li X, et al. "Densified Aligned Carbon Nanotube Films via Vapor Phase Infiltration of Carbon." Carbon 2007; 45(4):847-51.
Li X, et al. "Air-assisted growth of ultra-long carbon nanotube bundles." Nanotechnology 2008;19(45):455609.
Liu, Y, et al. "Kabob-Like Carbon Nanotube Hybrids." Chem. Lett. 2006; 35(2):200-1.
Liu, Q, et al. "Diameter selective growth of single-walled carbon nanotubes with high quality by floating catalyst method." ACS Nano 2008;2(8):1722-8.
Liu, M. et al. "Thickness Dependent Mechanical Properties of Polydimethyl Siloxane Membranes." J. Micromech. Microeng. 2009, 19, 035028-035031.
Liu L, et al. "Macroscopic Carbon Nanotube Assemblies: Preparation, Properties, and Potential Applications." Small 2011; 7(11):1504-20.
Loret, B., et al. "Articular Cartilage with Intra- and Extrafibrillar Waters: a Chemo-Mechanical Model." Mech. Mater. 2004, 36, 515-541.
Ma, S.B., et al. "Synthesis and Characterization of Manganese Dioxide Spontaneously Coated on Carbon Nanotubes." Carbon 2007; 45(2):375-82.
Maghrebi, M. et al. "Acetic acid effects on enhancement of growth rate and reduction of amorphous carbon deposition on CNT arrays along a growth window in a floating catalyst reactor." Applied Physics A: Materials Science & Processing 2009;97(2):417-24.
Misra, A.; et al. "Strain rate effects in the mechanical response of polymeranchored carbon nanotube foams." Adv. Mater. 2009, 21, 334-338.
Misra, A., et al. "Effect of Density Variation and Non-Covalent Functionalization on the Compressive Behavior of Carbon Nanotube Arrays." Nanotechnology 2011, 22, 425705-425711.
Misra A, et al. "Synthesis and characterization of carbon nanotube-polymer multilayer structures", ACS Nano 2011;5(10):7713-7721.
Moon, S.Y. et al. "Easy Synthesis of a Nanostructured Hybrid Array Consisting of Gold Nanoparticles and Carbon Nanotubes." Carbon 2009, 47(12):2924-32.
Mülenbein H., "The science of breeding and its application to the Breeder Genetic Algorithm (BGA)." Evol Comput 1994;1(4):335-60.
Mylvaganam, K.., et al. "Energy Absorption Capacity of Carbon Nanotubes Under Ballistic Impact." Appl. Phys. Lett. 2006, 89, 123127-123130.
Namilae, S. et al. "Role of atomic scale interfaces in the compressive behavior of carbon nanotubes in composites." Compos. Sci. Technol. 66:13, pp. 2030-2038, Oct. 2006.
Naraghi, M. et al. "A Multiscale Study of High Performance Double-Walled Nanotube-Polymer Fibers." ACS Nano 2010, 4, 6463-6476.
Neocleus, S. et al., "Hierarchical Carbon Nanotube—Inorganic Hybrid Structures Involving CNT Arrays and CNT Fibers." Func. Mater. Lett. 2011; 4(1):83-9.
Nessim, G.D., et al. "Tuning of verticallyaligned carbon nanotube diameter and areal density through catalyst pre-treatement." Nano Letters 2008;8(11):3587-93.
Ng K.C., et al. "Individual and Bipolarly Stacked Asymmetrical Aqueous Supercapacitors of CNTs/SnO2 and CNTs/MnO2 Nanocomposites." J. Electrochem. Soc. 2009; 11:A846-53.
O'Connell, M.J. et al. "Band gap fluorescence from individual single-walled carbon nanotubes", Science 297 593-6; 2002.
Okita A, et al. "Effects of hydrogen on carbon nanotube formation in CH4/H2 plasmas." Carbon 2007;45(7):1518-26.
Otieno, G., et al. "Processing and Properties of Aligned Multi-Walled Carbon Nanotube/Aluminoborosilicate Glass Composites Made by Sol-Gel Processing." Carbon 2010; 48(8):2212-7.
Pinault, M, et al. "Evidence of Sequential Lift in Growth of Aligned Multiwalled Carbon Nanotube Multilayers." Nano Letters 2005; 5:2394-2398.
Puglisi, G, et al. "Thermodynamics of rate independent plasticity." J Mech Phys Solids 2005;53(3):655-79.
Pushparaj, V. L., et al. "Effects of Compressive Strains on Electrical Conductivities of a Macroscale Carbon Nanotube Block." Appl. Phys. Lett. 2007, 91, 153116-153118.
Qian, D., et al., "Mechanics of Carbon Nanotubes." Appl. Mech. Rev. 2002; 55(6):495-532.
Ramachandra, S., et al. "Impact Energy Absorption in an Al Foam at Low Velocities." Scr. Mater. 2003, 49, 741-745.
Rance, G.A., et al. "Van der Waals interactions between nanotubes and nanoparticles for controlled assembly of composite nanostructures." ACS Nano. 4(8):4920-8; Aug. 24, 2010.
Raney, J.R., et al. "In situ synthesis of metal oxides in carbon nanotube arrays and mechanical properties of the resulting structures." Carbon 50 (2012); 4432-4440.
Raney, J. R., et al. "Modeling and in Situ Identification of Material Parameters for Layered Structures Based on Carbon Nanotube Arrays." Compos. Struct. 2011, 93, 3013-3018.

(56) References Cited

OTHER PUBLICATIONS

Raney, J.R., et al. "Tailoring the microstructure and mechanical properties of arrays of aligned multiwall carbon nanotubes by utilizing different hydrogen concentrations during synthesis." Carbon 2011;49:3631-3638.
Romo-Negreira, A, et al. "Electrochemical tailoring of catalyst nanoparticles for CNT spatial-dimension control." Journal of the Electrochemical Society 2010;157(3):K47-51.
Sansom, E. B., et al. "Controlled Partial Embedding of Carbon Nanotubes within Flexible Transparent Layers." Nanotechnology 2008, 19, 035302-035308.
Shin, M. et al. "Elastomeric Conductive Composites Based on Carbon Nanotube Forests." Adv. Mater. 2010, 22, 2663-2667.
Suhr, J., et al. "Viscoelasticity in Carbon Nanotube Composites." Nat. Mater. 2005, 4, 134-137.
Suhr, J. et al. "Fatigue resistance of aligned carbon nanotube arrays under cyclic compression." Nature Nano 2007;2(7):417-21.
Suresh, S. et al. "Graded materials for resistance to contact deformation and damage." Science 2001; 292(5526):2447-51.
Tong, T. et al. "Height independent compressive modulus of vertically aligned carbon nanotube arrays." Nano Letters 2008;8(2):511-5.
Toth, G. et al. "Carbonnanotube-based electrical brush contacts." Adv Mater 2009; 21(20):2054-8.
Tummala, N. R., et al. "SDS surfactants on carbon nanotubes: aggregate morphology." ACS Nano. (3) 595-602; 2009.
Vaisman, L., et al. "The role of surfactants in dispersion of carbon nanotubes." Adv. Colloid Interface Sci. 128 37-46; 2006.
Wang, C.M., et al. "Recent studies on buckling of carbon nanotubes." Applied Mechanics Reviews 2010;63(3):030804.
Wang, W., et al. "Vertically Aligned Silicon/Carbon Nanotube (VASCNT) Arrays: Hierarchical Anodes for Lithium-Ion Battery." Electrochem. Comm. 2011; 13(5):429-32.
Wang, E. et al. "The blast resistance of sandwich composites with stepwise graded cores." International Journal of Solids and Structures 2009, 46, 3492-3502.
Wasel, W., et al. "Experimental characterization of the role of hydrogen in CVD Synthesis of MWCNTs." Carbon 2007;45(4):833-8.
Xie, X.L., et al. "Dispersion and Alignment of Carbon Nanotubes in Polymer Matrix: A Review." Mater. Sci. Eng. R 2005; 49(4):89-112.
Yakobson, B.I., et al. "Nanomechanics of Carbon Tubes: Instabilities beyond Linear Response." Phys. Rev. Lett. 1996; 76(14):2511-4.
Yang, J., et al. A New Device for Measuring Density of Jaw Bones. Dentomaxillo facial Radiol. 2002, 31, 313-316.
Yurekli, K, et al. "Small-angle neutron scattering from surfactant-assisted aqueous dispersions of carbon nanotubes." J. Am. Chem. Soc. 126 9902-3; 2004.
Zhang, M., et al. "Multifunctional Carbon Nanotube Yarns by Downsizing an Ancient Technology." Science 2004,306,1358-1361.
Zhang G, et al. "Ultra-high-yield growth of vertical single-walled carbon nanotubes: hidden roles of hydrogen and oxygen." Proceedings of the National Academy of Sciences of the United States of America 2005;102(45):16141-5.
Zhang H., et al. "Influence of ethylene and hydrogen flow rates on the wall number, crystallinity, and length of millimeter-long carbon nanotube array." Journal of Physical Chemistry C 2008;112(33):12706-9.
Zhang, H.L., et al. "Kinetically Controlled Catalytic Synthesis of Highly Dispersed Metal-in-Carbon Composite and its Electrochemical Behavior." J. Mater. Chem. 2009; 19(47):9006-11.
Zhang, Q., et al. "Energy-Absorbing Hybrid Composites Based on Alternate Carbon-Nanotube and Inorganic Layers." Adv. Mater. 2009, 21, 2876-2880.
Zhao, B., et al. "Improvement on Wettability Between Carbon Nanotubes and Sn." Surface Engineering 2009; 25(1):31-5.
Zhou, J.J., et al. "Flow conveying and diagnosis with carbon nanotube arrays." Nanotechnology 17, 4845-53, 2006.

PCT International Search Report issued for PCT Application No. PCT/US2012/041275 filed on Jun. 7, 2012 in the name of California Institute of Technology et al. Mail Date: Apr. 25, 2013.
PCT Written Opinion issued for PCT Application No. PCT/US2012/041275 filed on Jun. 7, 2012 in the name of California Institute of Technology et al. Mail Date: Apr. 25, 2013.
Behr, M.J. et al. "Effect of hydrogen on catalyst nanoparticles in carbon nanotube growth" Journal of Applied Physics 108, (2010) 053303-1-053303-8.
Bottini, M. et al. "Covalent decoration of multi-walled carbon nanotubes with silica nanoparticles" Chem. Commun. (2005) 758-760.
Final Office Action mailed on Sep. 11, 2015 for U.S. Appl. No. 13/868,952, filed Apr. 23, 2013 in the name of California Institute of Technology.
Lu, C. et al. "Controlling the diameter of carbon nanotubes in chemical vapor deposition method by carbon feeding" J. Phys. Chem. B 110, (2006) 20254-20257.
Non-Final Office Action mailed on Feb. 26, 2015 for U.S. Appl. No. 13/868,952, filed Apr. 23, 2013 in the name of California Institute of Technology.
Non-Final Office Action mailed on Feb. 5, 2014 for U.S. Appl. No. 13/491,014, filed Jun. 7, 2012 in the name of California Institute of Technology.
Non-Final Office Action mailed on Oct. 21, 2015 for U.S. Appl. No. 14/700,035, filed Apr. 29, 2015 in the name of California Institute of Technology.
Non-Final Office Action mailed on Oct. 3, 2014 for U.S. Appl. No. 13/491,014, filed Jun. 7, 2012 in the name of California Institute of Technology.
Notice of Allowance mailed on Feb. 18, 2015 for U.S. Appl. No. 13/491,014, filed Jun. 7, 2012 in the name of California Institute of Technology.
Restriction Requirement mailed on Dec. 1, 2014 for U.S. Appl. No. 13/868,952, filed Apr. 23, 2013 in the name of California Institute of Technology.
Restriction Requirement mailed on Oct. 2, 2015 for U.S. Appl. No. 13/866,596, filed Apr. 19, 2013 in the name of California Institute of Technology.
Restriction Requirement mailed on Oct. 2, 2015 for U.S. App. No. 13/870,954, filed Apr. 25, 2013 in the name of California Institute of Technology.
Yaglioglu O., "Carbon nanotube based electromechanical probes." Massachusetts Institute of Technology, PhD Thesis, Cambridge, MA, USA, Jun. 2007.
Zhang, Y. et al. "Tailoring the morphology of carbon nanotube arrays: from spinnable forests to undulating foams" ACS NANO 3(8) (2009) 2157-2162.
Maghrebi M, Khodadadi AA, Mortazavi Y, Sane A, Rahimi M, Shirazi Y, et al. Acetic acid effects on enhancement of growth rate and reduction of amorphous carbon deposition on CNT arrays along a growth window in a floating catalyst reactor. Applied Physics A: Materials Science & Processing 2009; 97(2):417-24.
Cao AY, et al. Super-compressible foam like carbon nanotube films, Science 2005; 310 (5752):1307-10.
Ajayan, P. M.; Schadler, L. S.; Giannaris, C.; Rubio, A. Single Walled Carbon Nanotube: Polymer Composites: Strength and Weakness. Adv. Mater. 2000, 12, 750-753.
Barker, M. K.; Seedhom, B. B. The Relationship of the Compressive Modulus of Articular Cartilage with its Deformation Response to Cyclic Loading: Does Cartilage Optimize its Modulus so as to Minimize the Strains Arising in it Due to the Prevalent Loading Regime? Rhumatology 2001, 40, 274-284.
Baughman, R.H. et al., Carbon nanotubes: the route toward applications, Science, 2002, vol. 297, Issue 5582, pp. 787-792.
Raney, J.R. et al., Tailoring the microstructure and mechanical properties of arrays of aligned multiwall carbon nanotubes by utilizing different hydrogen concentrations during synthesis, Carbon, 2011, 49, pp. 3631-3638.
Jackson, J.J. et al., Pulsed Growth of Vertically Aligned Nanotube Arrays with Variable Density, ACS Nano, 2010, 4, pp. 7573-7581.

(56) References Cited

OTHER PUBLICATIONS

Liu, Q. et al., *Diameter-selective growth of single-walled carbon nanotubes with high quality by floating catalyst method*, ACS Nano, 2008, 2(8), pp. 1722-8.

Okita, A. et al., *Effects of hydrogen on carbon nanotube formation in CH4/H2 plasmas*, Carbon, 2007, 45(7), pp. 1518-26.

Nessim, G.D. et al., *Tuning of vertically-aligned carbon nanotube diameter and areal density through catalyst pre-treatement*, Nano Letters, 2008, 8(11), pp. 3587-93.

Dresselhaus, M.S. et al, *Raman spectroscopy of carbon nanotubes*, Physics Reports, 2005, 409(2), pp. 47-99.

Misra, A. et al., *Effect of density variation and non-covalent functionalization on the compressive behavior of carbon nanotube arrays*, Nanotechnol., 2011, 22, 425705.

Suhr, J. et al., *Fatigue resistance of aligned carbon nanotube arrays under cyclic compression*, Nature Nano, 2007, 2(7), pp. 417-21.

Li, X. et al., *Bottom-up growth of carbon nanotube multilayers: unprecedented growth*, Nano Letters, 2005, 5, pp. 1997-2000.

Misra, A. et al., *Strain rate effects in the mechanical response of polymer-anchored carbon nanotube foams*, Adv. Mater., 2009, 21, pp. 334-338.

Ajdari, A. et al., *Dynamic crushing and energy absorption of regular, irregular and functionally graded cellular structures*, International Journal of Solids and Structures, 2011, 48, pp. 506-516.

Wang, E. et al., *The blast resistance of sandwich composites with stepwise graded cores*, International Journal of Solids and Structures, 2009, 46, pp. 3492-3502.

Cui, L. et al., *Designing the energy absorption capacity of functionally graded foam materials*, Materials Science and Engineering A, 2009, 507, pp. 215-225.

Pushparaj, V.L. et al., *Effects of compressive strains on electrical conductivities of a macroscale carbon nanotube block*, Appl. Phys. Lett., 2007, 91, 153116.

Zhang, G. et al., *Ultra-high-yield growth of vertical single-walled carbon nanotubes: hidden roles of hydrogen and oxygen*, Proceedings of the National Academy of Sciences of the United States of America, 2005,102(45), pp.16141-16145.

Britz, D. et al. "Noncovalent interactions of molecules with single walled carbon nanotubes" Chemical Society Reviews. Mar. 23, 2006, vol. 35, pp. 637-659.

Li, X. et al. "Efficient Synthesis of Carbon Nanotube—Nanoparticle Hybrids" Advanced Functional Materials. 2006, vol. 16, pp. 2431-2437.

Non-Final Office Action for U.S. Appl. No. 13/870,954, filed Apr. 25, 2013 on behalf of Chiara Daraio. Mail Date: Mar. 22, 2016. 23 pages.

Advisory Action for U.S. Appl. No. 13/868,952, filed Apr. 23, 2013 on behalf of Abha Misra. Mail Date: Feb. 22, 2016. 4 pages.

Non-Final Office Action for U.S. Appl. No. 13/868,952, filed Apr. 23, 2013 on behalf of Abha Misra. Mail Date: Apr. 5, 2016. 11 pages.

Final Office Action for U.S. Appl. No. 14/700,035, filed Apr. 29, 2015 on behalf of Jordan R. Raney. Mail Date: Jan. 21, 2016. 6 pages.

Non-Final Office Action for U.S. Appl. No. 14/700,035, filed Apr. 29, 2015 on behalf of Jordan R. Raney. Mail Date: May 10, 2016. 14 pages.

\* cited by examiner

US 9,616,635 B2

MULTILAYER FOAM STRUCTURES OF NOMINALLY-ALIGNED CARBON NANOTUBES (CNTS)

CROSS REFERENCE TO RELATED APPLICATIONS

The present application claims priority to U.S. Provisional Application No. 61/636,498, filed on Apr. 20, 2012, which is incorporated herein by reference in its entirety. The present application can be related to U.S. patent application Ser. No. 13/491,014, filed on Jun. 7, 2012, which is incorporated herein by reference in its entirety.

STATEMENT OF FEDERAL GRANT

This invention was made with government support under W911NF-09-D-0001 awarded by the Army Research Office. The government has certain rights in the invention.

FIELD

The present disclosure relates to a method for making multilayer foam structures of nominally-aligned carbon nanotubes (CNTs) and to multilayer foam structures of CNTs with improved mechanical properties.

BACKGROUND

Nominally-aligned arrays of carbon nanotubes (CNTs) are known to behave as low-density energy dissipative foams under compression. The material can be readily synthesized using standard thermal chemical vapor deposition techniques, resulting in a foam-like bulk material consisting of trillions of CNTs per square centimeter.

SUMMARY

According to a first aspect of the present disclosure, a method for making a multilayer foam structure of nominally-aligned carbon nanotubes (CNTs) is provided. The method comprises synthesizing a layer of CNTs and sandwiching the layer of CNTs between two polymeric layers.

According to a second aspect of the present disclosure, a method for making a foam structure of nominally-aligned carbon nanotubes (CNTs) is provided. The method comprises synthesizing a layer of CNTs, overlapping a first side of the layer of CNTs with a first polymeric layer, overlapping a second side of the layer of CNTs with a second polymeric layer to obtain a multilayer structure of alternating polymeric layers and a layer of CNTs, and stacking a plurality of said multilayer structures, thus making the foam structure.

According to a third aspect of the disclosure, a foam structure is provided. The foam structure comprises a layer of nominally-aligned carbon nanotubes (CNTs) sandwiched between two polymeric layers.

According to a fourth aspect of the disclosure, a method for making a foam structure of nominally-aligned carbon nanotubes (CNTs) is provided. The method comprises synthesizing a layer of CNTs and sandwiching the layer of CNTs between two metal layers or two metal foils.

According to a fifth aspect of the disclosure, a foam structure is provided. The foam structure comprises a layer of nominally-aligned carbon nanotubes (CNTs) sandwiched between two metal layers or two metal foils.

Further aspects of the disclosure are shown in the specification, drawings and claims of the present application.

DETAILED DESCRIPTION

Figure 1A:
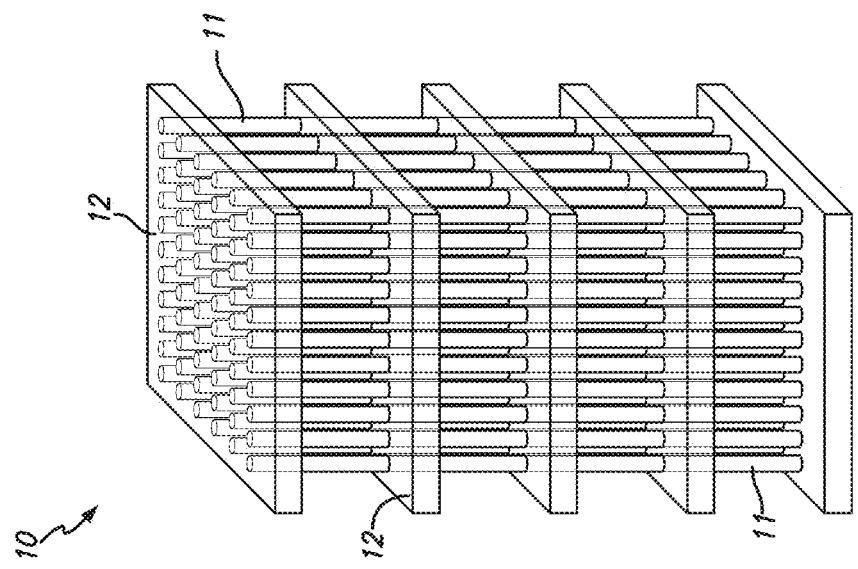
FIG. 1A shows a schematic diagram of a multilayer carbon nanotube-polymer (PDMS) structure according to some embodiments of the present disclosure.

Throughout the present disclosure, embodiments and variations are described for the purpose of illustrating uses and implementations of the inventive concept. The illustrative description should be understood as presenting examples of the inventive concept, rather than as limiting the scope of the concept as disclosed herein. Like reference numerals indicate corresponding parts in various figures. The words and phrases used in the present disclosure should be understood and interpreted to have a meaning consistent with the understanding of those words and phrases by those skilled in the relevant art.

In the present disclosure, the expression "nominally-aligned arrays of carbon nanotubes" can be used to refer to ordered structures or arrangements of nanotubes which can naturally align themselves and can be held together by Van der Waals forces and lateral entanglement of the CNTs, which are not perfectly parallel (hence "nominally-aligned"). In this context, the term "alignment" can refer to "bundles" or "groups" of CNTs, and not specifically on the alignment of the individual tubes in the arrangement.

In the present disclosure, the expression "synthesis", which is, for example, included in the expression "synthesis process", "synthesis parameters" or "method for synthesizing", can refer to a process in which volatile or gas-phase precursors including a carbon source react on a substrate, leading to nanotube growth. In some embodiments of the present disclosure, the synthesis can be a process based on chemical vapor deposition (CVD). According to some example embodiments of the present disclosure, CVD synthesis can be achieved by taking carbon species in the gas phase and using an energy source, such as plasma, a resistively heated coil or heat in general, such as the heat of a heated furnace, to impart energy to a gaseous carbon molecule. For example, gaseous carbon sources can include toluene, methane, carbon monoxide, and acetylene. The energy source can be used to "crack" the carbon molecule into a reactive radical species. These radical reactive species can then be diffused down to the substrate, which can be heated and coated in a catalyst (usually a first row transition metal such as Ni, Fe, or Co) where it will bond. According to some example embodiments, the synthesis of nominally-aligned CNTs can include a floating catalyst thermal chemical vapor deposition (TCVD) system that can include a reaction zone (furnace), a precursor solution including a catalyst and a carbon source, and a carrier gas to move the solution into the reaction zone. The synthesis of the CNTs can take place on a thermally oxidized surface (for example, Si surface) placed inside the furnace prior to the reaction.

Typical elastomeric open cell foams can be constructed out of polymeric materials and can exhibit a hysteretic, energy-dissipative response under compression. Open cell foams can be used as lightweight protective layers for a variety of applications. These foams can show three distinct regions of behavior when compressed. At small strains, the material can respond in a linear elastic fashion. For intermediate strains, the material can enter a plateau regime throughout which the stress changes only a small amount with increasing strain. For large strains, the foam can transition to a densification regime in which stress can rise rapidly for small increases in strains. In practical applications, having a wide plateau can be useful, as it results in a large amount of energy dissipation prior to a dramatic rise in transmitted force (densification). It could be useful to know at what stress level the plateau is approximately located, as this is the force transmitted through the foam to the protected material underneath for most of the compression. Foams can therefore be selected according to the protective threshold required by the application, with the plateau stress of the foam somewhere less than the threshold. Once densification occurs, the rapid rise in stress can quickly result in damage to whatever object is supposed to be protected by the foam.

In accordance with the present disclosure, aligned arrays of multiwall CNTs synthesized in certain ways can behave similar to elastomeric open cell foams, with the same three-regime deformation behavior and recovery from large strains [see for example, references 2 and 3, incorporated herein by reference in their entirety]. Moreover, in comparing the performance of foams constructed from CNT arrays to that of typical polymeric foams of comparable density (0.1-0.3 g cm$^{-3}$), it can be observed that the CNT foams dissipate at least 200 times the amount of energy in quasi-static compression tests conducted to 0.8 strain [see for example, reference 4, incorporated herein by reference in its entirety]. Despite these promising characteristics, the typical CNT synthesis processes have resulted in enormous variability in the material properties, preventing their practical use.

Figure 1B:
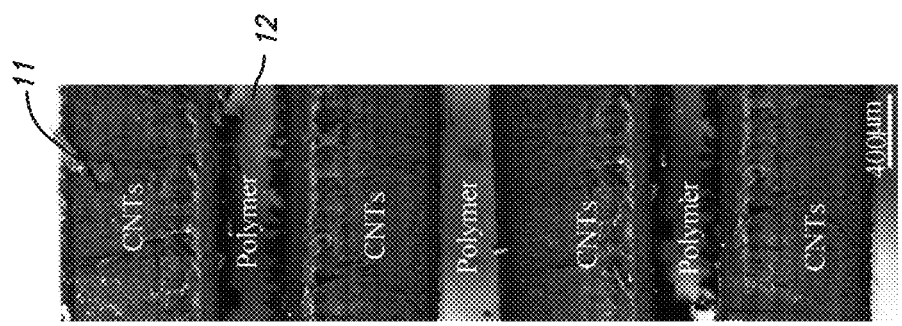
FIG. 1B shows an optical image of a multilayer carbon nanotube-polymer (PDMS) structure according to some embodiments of the present disclosure.
Figure 1C:
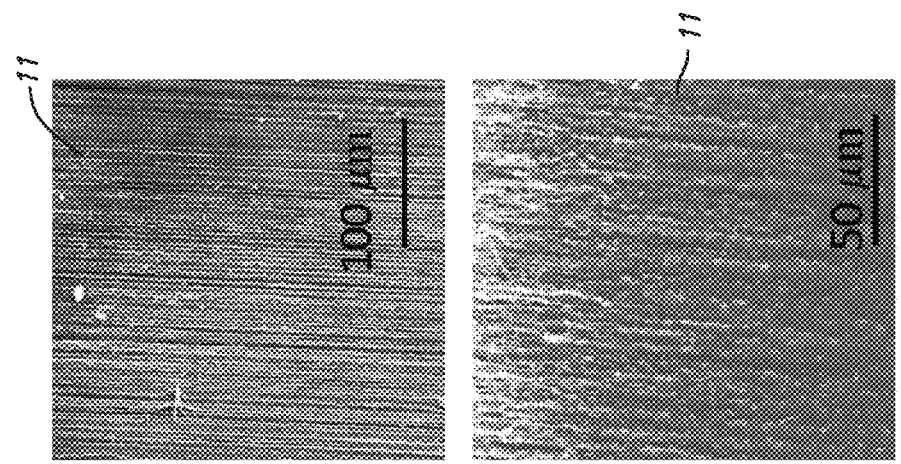
FIG. 1C shows a scanning electron microscope (SEM) image showing freestanding and wetted portions of the multilayer carbon nanotube-polymer (PDMS) structure of FIG. 1B.

According to several example embodiments of the present disclosure, FIG. 1A shows a schematic diagram of a multilayer structure consisting of four layers of carbon nanotube arrays bound by polymer (PDMS) interlayers, FIG. 1B shows an optical image of the multilayer structure of FIG. 1A and FIG. 1C shows a scanning electron microscope (SEM) image of freestanding and wetted portions of the structure of FIG. 1B.

As shown in the example embodiment of FIG. 1A, a process for making a structure (10) of nominally-aligned arrays of carbon nanotubes (CNTs) (11) can relate to fabrication and characterization of multilayer structures with compliant polymer interlayers (12), which can recover completely after large compressive strain without any damages at an interface between any two layers. The polymer layers (12) can reinforce the resilient aligned CNT bundles and can act as an interface material to strengthen the multilayer structure (10). To evaluate the behavior of these layered structures, mechanical tests can be performed with in situ electrical measurements and optical microscopy. In other words, lightweight multilayer materials for energy absorption can include structures (10) composed of alternating layers of aligned carbon nanotubes (11) and polymer (12), such as for example, polydimethylsiloxane (PDMS) layers. Moreover, the resulting materials can be combined into a fibrous microstructure with graded mechanical properties.

The presence of polymer interlayers (12) can provide adhesion and can prevent delamination between different layers under mechanical loading. These materials can have good energy-absorbing ability (up to 3 orders of magnitude better than conventional packaging foams of similar density) and can present localized deformation within the individual layers composing the structure.

Figures 1D, 1E:
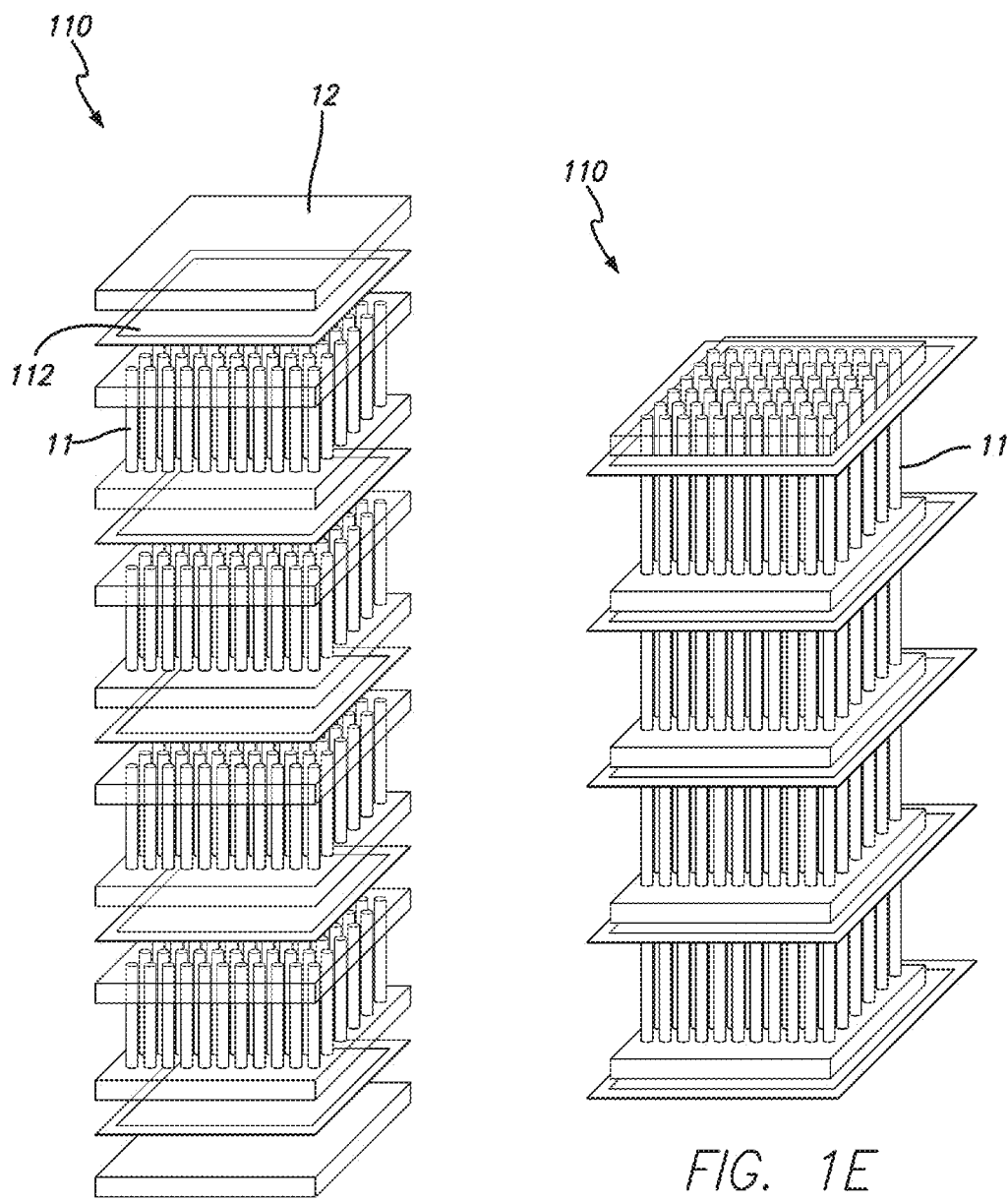
FIG. 1D shows a schematic diagram of a multilayer CNT system with embedded polymer and buckypaper layers according to some embodiments of the present disclosure.
FIG. 1E shows an arrangement of a multilayer structure that comprises carbon nanotubes layers, polymer layers, and buckypaper film within the polymer layers, according to some embodiments of the present disclosure.

According to an example embodiment of the present disclosure, FIG. 1D shows a schematic diagram of a multilayer CNT system with embedded polymer and buckypaper layers. As shown in the example embodiment of FIG. 1D, a structure (110) can comprise conductive buckypaper (112) within the polymer interlayers (12) and thus can provide electrical conductivity across the material's thickness without degradation of the overall mechanical properties. Ex situ and in situ electrical and optical measurements can be performed, revealing strain localization and differential collapse of the individual layers under compression.

In accordance with the several example embodiments of the present disclosure, vertically aligned arrays of carbon nanotubes (11) can be grown on thermally oxidized silicon by chemical vapor deposition using a one-stage thermal CVD system. Some examples of such processes can be found, for example, in reference 5, incorporated herein by reference in its entirety. A solution of ferrocene (catalyst) and toluene (carbon source) of 0.02 g mL$^{-1}$ can be fed into the furnace at a temperature of 825° C. throughout the process and the overall length of CNT bundles can be approximately 800 µm. The CNT samples can be then taken off from the substrate using a razor blade, and the bulk density can be determined by obtaining dimensions along the three axes and then dividing mass, as measured with a microbalance, by the volume of the CNT block. The density determined this way can be approximately 0.12-0.28 g cm$^{-3}$. After growth, a subset of samples can be partially anchored in thin polymeric layers, for example, polydimethylsiloxane (PDMS) layers.

In some embodiments of the present disclosure, the anchoring can be obtained with a multistep process. In the first step of this multistep process, the PDMS layers can be mixed with a curing agent in 10:1 ratio. In the next step, the mixture can be spin-coated on a glass slide to achieve a layer that can connect any two CNT layers (as shown in schematic diagram FIG. 1A) in a multilayer structure. The spin-coating can be performed, for example, at 700 rpm to achieve a layer of, for example, 50 µm thickness. The first layer of the CNT polymer multilayer structure can then be created by embedding the end segments of the carbon nanotubes in a PDMS polymer layer via a substrate transfer method. Some examples of such processes can be found, for example, in reference 5, incorporated herein by reference in its entirety. As shown in the example embodiments of FIGS. 1A and 1B, most of the CNT length cannot be embedded in the polymer. After curing the PDMS and CNT structure at 80° C., the CNTs can adhere well with the PDMS layer. Some examples of such processes can be found, for example, in reference 6, incorporated herein by reference in its entirety.

According to the example embodiment of FIG. 1A, for the fabrication of the multilayer structure (10), the process can be repeated sequentially for each layer in the structure. An image of the resulting multilayer structure, comprised of four CNT layers separated by polymer interlayers, is shown in FIG. 1B. The number of stacking layers can be extended utilizing the same fabrication process. As mentioned previously, FIGS. 1C and 1D show the scanning electron microscope (SEM) images with a close-up view of the polymer-free and embedded portions of the CNT array, respectively.

This partial polymer embedding can have structural and mechanical advantages in the layered structure as following: (1) it can support the CNT bases and tips, preventing separation between the layers during deformation, in contrast to what was observed in other reports [for example, see reference 9, incorporated herein by reference in its entirety], and (2) it can improve mechanical damping due to the compliant polymer matrix [for example, see references 7, and 8, incorporated herein by reference in their entirety].

Figure 1F:
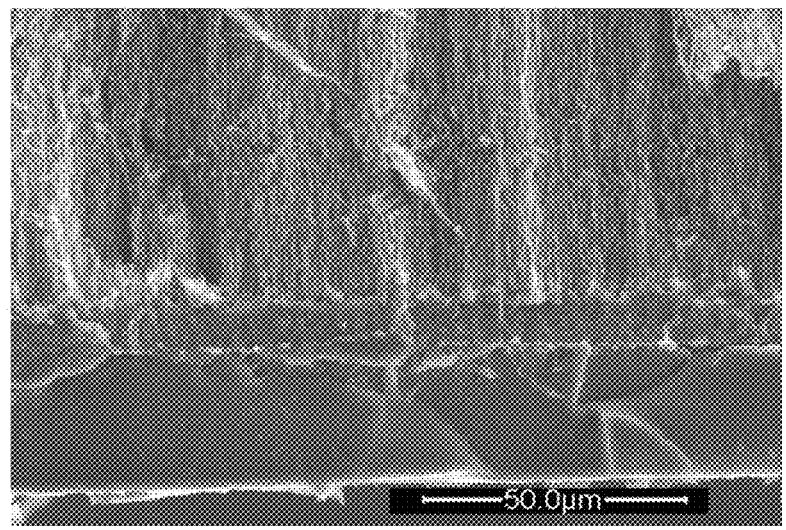
FIG. 1F shows a SEM image of a structure according to some embodiments of the present disclosure, wherein the image shows an interface between a polymer with embedded buckypaper film and the CNTs.
Figure 1G:
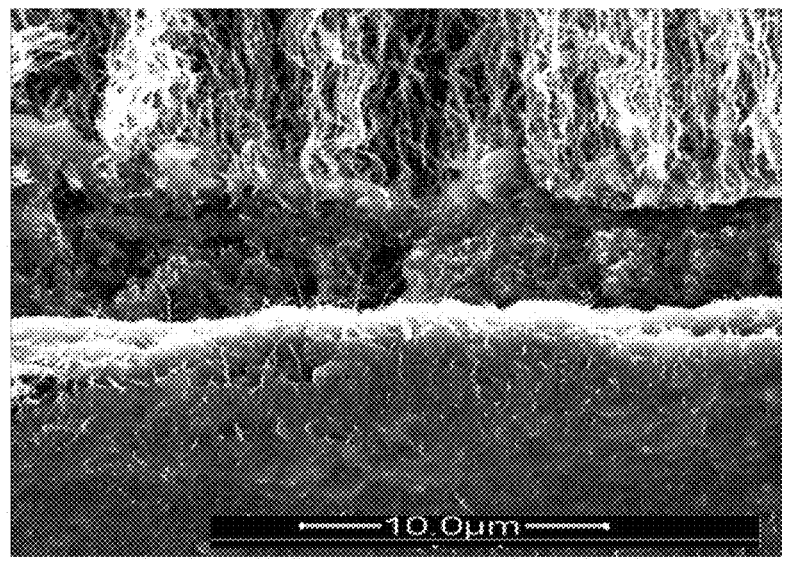
FIG. 1G shows a high resolution image of the interface shown in FIG. 1F.

According to some example embodiments of the present disclosure, a separate set of samples can be prepared including a thin conducting film of entangled CNTs, commonly known as buckypaper (BP), within the polymer layers. The presence of this approximately 10 µm thick BP can provide electrical continuity through each polymer layer and can render the entire multilayer structure electrically conductive. The BP thin film can be obtained by filtration of a CNT suspension in 2-propanol and water (25% vol). The films can be individually sandwiched within PDMS layers, as shown in FIG. 1D. The resulting multilayer CNT assembly is depicted in FIG. 1E. An SEM image of the interface between the CNT and the polymer with BP is shown in FIG. 1F, while a close-up view of the contact between the BP film in the polymer and the CNT arrays is shown in FIG. 1G. A quasi-static cyclic compressive response of the multilayer CNT polymer assemblies can be investigated using an Instron E3000.

Figure 2A:
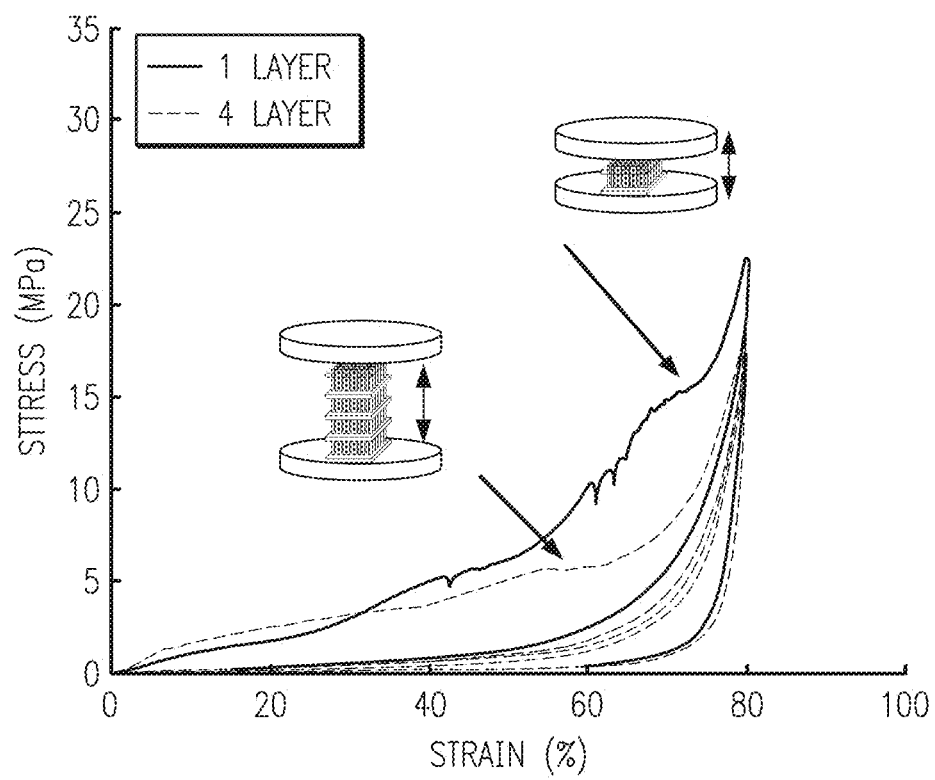
FIG. 2A shows typical stress-strain curves obtained during compression of structures of one or four layers of CNT arrays according to some embodiments of the present disclosure and without insertion of buckypaper film.

In accordance with the present disclosure, FIG. 2A shows typical stress-strain curves obtained with single and four-layer structures without insertion of buckypaper film. As evident from the curves of FIG. 2A, compressive loads can be applied along the CNT growth direction. In order to test the stability of the CNT polymer interfaces and to characterize their ability to recover from large deformations, displacement controlled compression tests can be performed on single- and four-layer CNT assemblies partially embedded in PDMS layers. In addition, to ensure reproducibility of the results, measurements can be acquired from six different samples for each type of structure (i.e., a single CNT layer in PDMS, both with and without BP film, as well as CNT-PDMS structures with four CNT layers, with and without BP films). The stress-strain response can be measured up to a set maximum compressive strain (for example, $\epsilon$ max=0.8), determined so as to avoid reaching the maximum force capacity of the machine, and at two selected strain rates (for example, $10^{-2}$ and 0.5 s$^{-1}$).

Figure 2B:
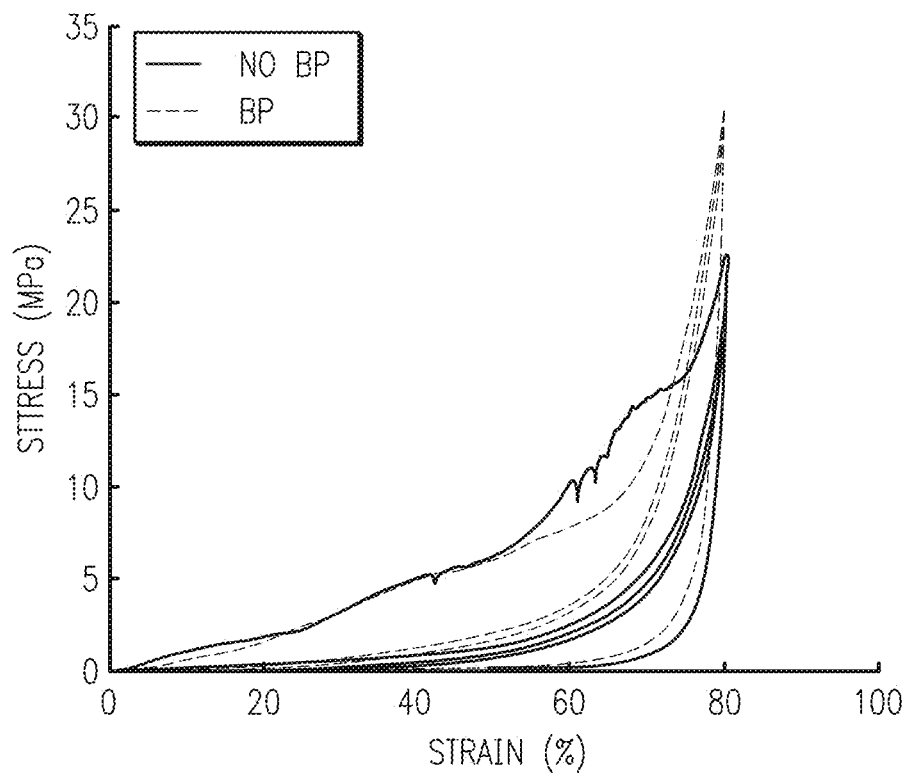
FIG. 2B shows typical stress-strain curves obtained during compression of multilayer structures with and without insertion of buckypaper films according to some embodiments of the present disclosure.

According to an example embodiment of the present disclosure, FIG. 2B shows typical stress-strain curves obtained with four-layer structures with and without insertion of buckypaper films. In several example embodiments of the present disclosure, both single and four-layer structures can present a nonlinear loading-unloading path with a hysteretic behavior in loading and unloading. The hysteresis can be a result of friction between the CNTs. In all cases, a foam-like behavior can be observed, which is similar to the freestanding vertically aligned CNT arrays [for example, see references 11 and 12, incorporated herein by reference in their entirety]. The measured compressive stress strain curves can reveal three different regimes of deformation [for example, see references 11, 12 and 13, incorporated herein by reference in its entirety], and the regimes can be characterized by:
(i) an initial linear elastic response at lower strains (less than 0.1),
(ii) an intermediate region (between 0.1 and 0.6 strain) in which the deformation increases monotonically with small variation in the associated stress (a behavior characteristic of coordinated buckling and bending), and (iii) a final rise of the stress to a peak between 20 and 30 MPa (for example, at the peak strain, $\epsilon=0.8$), resulting from densification and collapse of the overall assembly [see, for example, reference 2, incorporated herein by reference in its entirety.]

In accordance with the several example embodiments of the present disclosure, to analyze the linear elastic response of the sample, low strain stiffness can be calculated by a linear fitting of the initial linear elastic stress increase, associated with the first loading cycle in the stress-strain curves as shown in FIGS. 2A and 2B. For a single-layer structure, an average value of stiffness calculated by a linear fitting of the initial linear elastic stress increase can be $E=9.9\pm1.8$ MPa, and for the four layer structure as shown in FIG. 2A, the stiffness can be an enhanced modulus of $16.3\pm1.9$ MPa. In case the calculation of stiffness with samples including BP films, the measured lower modulus can be caused by increase in thickness of the compliant polymer [see for example, reference 15, incorporated herein by reference in its entirety], because structures with no BP have thinner polymer interlayers (for example, approximately 50 μm) than those with BP (for example, approximately 100 μm), and from the possible presence of slip between CNTs in the BP during compression [see for example, reference 14, incorporated herein by reference in its entirety].

As shown in the example embodiments of FIGS. 2A and 2B, after the elastic region, the stress strain response can present a monotonic increase in the stress between, for example, 0.1 and 0.6 strain. As shown in the example curves of FIGS. 2A and 2B, at strains higher than 0.6 the stress can start to increase rapidly, reaching a maximum peak value of approximately 24 MPa at the highest strain (0.8) for single layer structures with no BP. However, as shown in the exemplary curves of FIG. 2A, in case of four-layer structures with no BP, stress can be up to 19 MPa. Moreover, because of the variation in L/D ratios (where L is the height and D is the lateral dimension of the area of the samples), the deformation mechanisms in compression can differ between samples. Consequently, taller specimens can engage in compressive instabilities and non-uniaxial loading. As shown in FIG. 2B, in samples with BP films, higher peak stresses can be observed for both the single-layer (for example, approximately 29 MPa) and the four-layer structures (for example, approximately 23 MPa). The increase of the peak stress level in the structures with BP films can be explained by an enhanced compressive strength due to the reinforcement of the carbon nanotube ends in polymer at the interfaces as compared to the cases of free-standing CNTs and polymer only. Some example of such cases can be found in reference 7, incorporated herein by reference in its entirety.

Additionally, in accordance with the present disclosure, the polymer around CNTs can provide a confining effect, which can result in strengthening of the composite interface in the structure. Some examples of such cases can be found in reference 7, incorporated herein by reference in its entirety. The residual strain, which corresponds to the permanent deformation in the structure after compression, can be approximately 0.05 in all samples. Moreover, in the example embodiments of FIGS. 2A and 2B, both the peak stress and the hysteresis area can be observed to decrease with an increasing number of compressive cycles. The example embodiments of FIGS. 2A and 2B show the first three compressive cycles for each type of sample. As shown in FIGS. 2A and 2B, a small difference can be observed between the second and third compressive cycles for all samples shown, revealing that after only a couple cycles the majority of the compressive damage can take place, with the material nearly in a steady-state response for further cycles. Some example of such cases can be found in reference 2, incorporated herein by reference in its entirety. A similar characteristic behavior can be observed for multilayer structures with BP films.

Figure 2C:
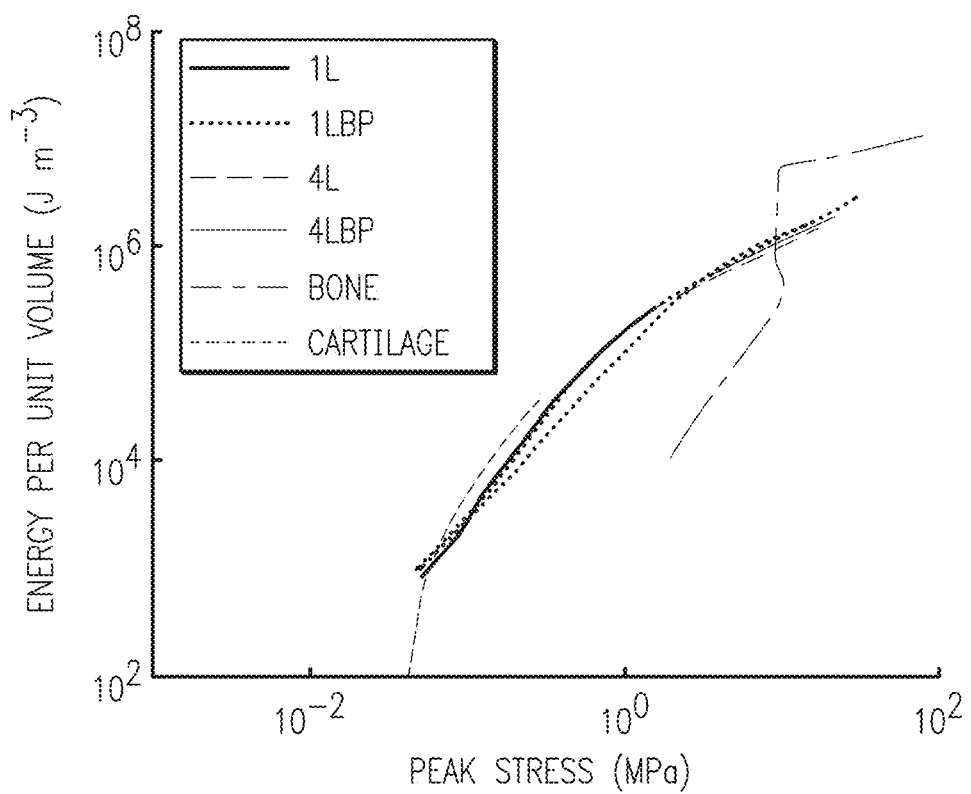
FIG. 2C shows energy absorption plots calculated from the compressive stress-strain response of the multilayer structures according to some embodiments of the present disclosure and compared with cancelleous bone and cartilage.

In accordance with the present disclosure, the example stress-strain curves, as shown in FIGS. 2A and 2B, obtained in the quasistatic tests can be used to calculate the energy absorption capabilities of all samples. Depending on what material the CNT-based structures were being compared to, this quantity can be calculated in two different ways. According to a first option, the energy absorbed during loading (method 1) can be calculated, for comparison with materials having porous and layered microstructure that permanently deform in loading. According to a second option, the energy absorption can be calculated as the area enclosed by the hysteresis loop between loading and unloading, where such calculations can be compared with corresponding calculations for protective materials that can recover after loading (method 2). Consequently, for the comparison with permanently deforming materials, the area under the loading portion of the stress strain curves can be integrated and subsequently the values (per unit volume) can be plotted up to a given peak stress as a function of the peak stress, as shown in FIG. 2C. Moreover, as shown in FIG. 2C, since the CNT-based materials can recover from strain, a portion of the energy absorption indicated for the CNT-based materials in the plots of FIG. 2C can be a result of elastic energy that can be recovered. However, it can be useful to make the comparison of how the energy absorption capacity varies as a function of compression (peak stress) during loading.

As shown in the example stress-strain curves of FIGS. 2A and 2B, the recovery or unloading portion of the hysteresis can take place at very low stress levels, which can imply that the recovered elastic strain energy can be a small portion of the total energy absorbed during loading. Based on this result, the energy absorption capabilities of CNT polymer-based materials can be compared with the energy absorption of biological materials that can employ a multilayer composite structure with a foam-like interior and a denser exterior region, such as cancelleous bone and lamellar fibers such as cartilage. Some examples of such structures can be found in references 18 and 19, each of which is incorporated herein by reference in its entirety. For example, the data for biological materials can be extracted from the reported stress strain curves given in references 18 and 19, and it can be shown that the CNT-based materials can have comparable or better energy absorption capabilities than cartilage [see for example, reference 19, incorporated herein by reference in its entirety] as a function of peak stress, despite having bulk densities between, for example, 0.12 and 0.28 g cm$^{-3}$ (as described above) compared to 1.12 g cm$^{-3}$ for cartilage [see, for example, reference 20, incorporated herein by reference in its entirety].

Figure 2D:
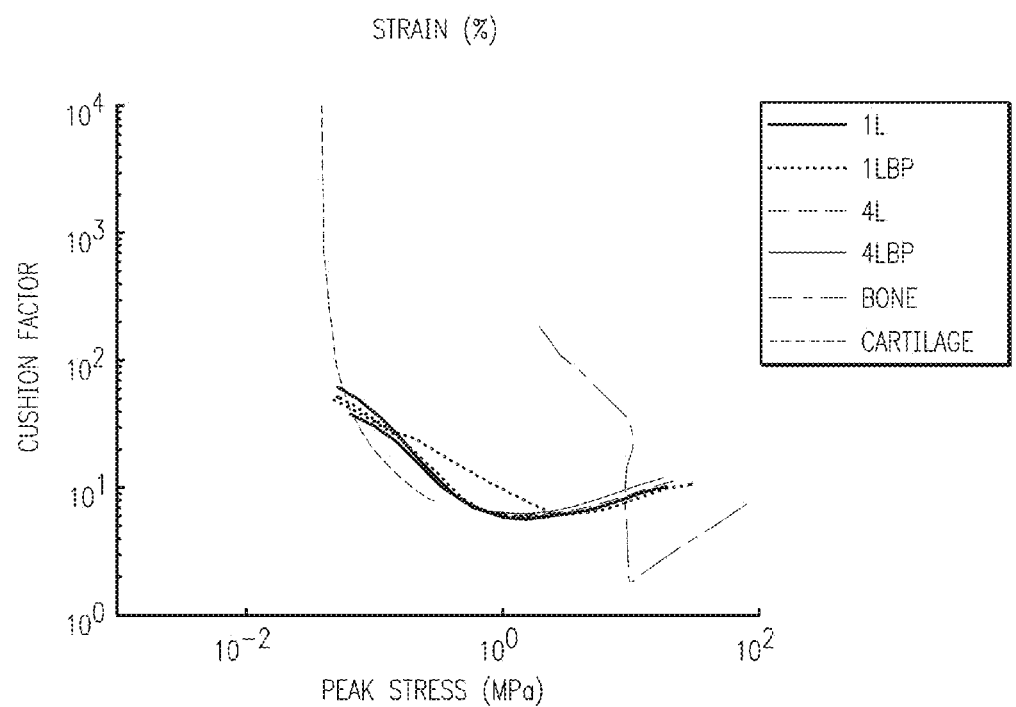
FIG. 2D shows the cushion factor calculated from the compressive stress-strain response of the multilayer structures according to some embodiments of the present disclosure and compared with those of cartilage and bone.

According to some embodiments of the present disclosure, CNT-based materials can show improved energy absorption over cancelleous bone up to a critical value of measured peak stress (for example, approximately 10 MPa). At higher peak stresses, cancelleous bone can show higher energy absorption than the CNT-based structures, which can be related to its larger density (for example, approximately ~1.85 g cm$^{-3}$) and more complex microstructure. Some examples of such cases can be found in reference 21, incorporated herein by reference in its entirety. A cushion factor [for example, see reference 18, incorporated herein by reference in its entirety] can be calculated as the measured peak stress over energy absorbed for the different CNT polymer structures. The cushion factor values for all types of tested CNT-polymer structures can be plotted against the peak stresses and compared with those for cartilage and bone, as shown in the exemplary curves of FIG. 2D. As shown in the example embodiment of FIG. 2D, in the lower peak stress regime, the cushion factor of CNT structures can be higher than the cartilage and bone structures. Moreover, as shown in the curves of FIG. 2D, among the CNT-polymer structures, both the energy absorption and cushion factors do not have significant differences at any value of peak stress. The energy dissipation in the multilayer structures according to some embodiments of the present disclosure can be expected to derive from frictional interactions between adjacent, entangled CNTs in the section of the CNTs not embedded in polymer, and from the presence of a soft and compliant polymer interlayer partially embedding the CNTs. In addition, relative twisting of the CNT bundles can contribute to the energy dissipation, similar to the dissipation which can be observed in the shear interaction of CNT fibers [see, for example, references 11 and 16, incorporated herein by reference in their entirety].

In accordance with the present disclosure, to evaluate the performance of the CNT-polymer structures in comparison with protective materials presenting large recovery after deformation, for example, different commercially available foams (CFs) obtained from microelectronic packaging and protective padding derived from cellulose fibers, polyurethane, and rubber, can be selected. In such cases, densities of the CFs can vary, for example, from 0.02 to 0.2 g cm$^{-3}$. The CNT-based structures, according to some embodiments of the present disclosure, can be compared to the CFs by comparing their quasi-static performance and the data can be presented for tests performed at a strain rate of, for example, 0.05 s$^{-1}$. In this case, the response of the CNT-based structures can be strain rate independent in this regime as discussed in reference 10, incorporated herein by reference in its entirety.

Figure 2E:
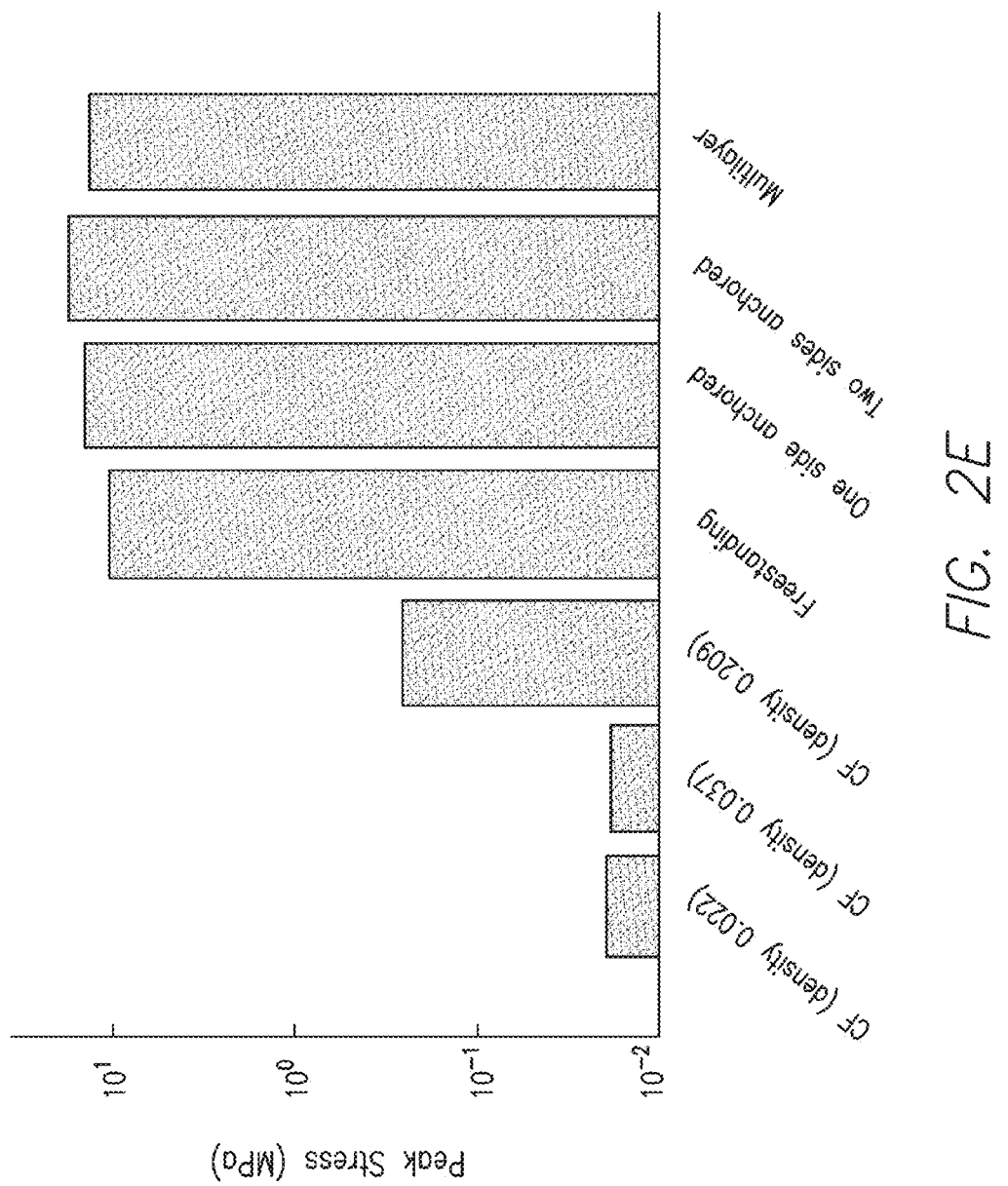
FIGS. 2E and 2F show maximum peak stress and energy absorbed per unit volume for commercial foams (CFs) and CNT structures according to some embodiments of the present disclosure.
Figure 2F:
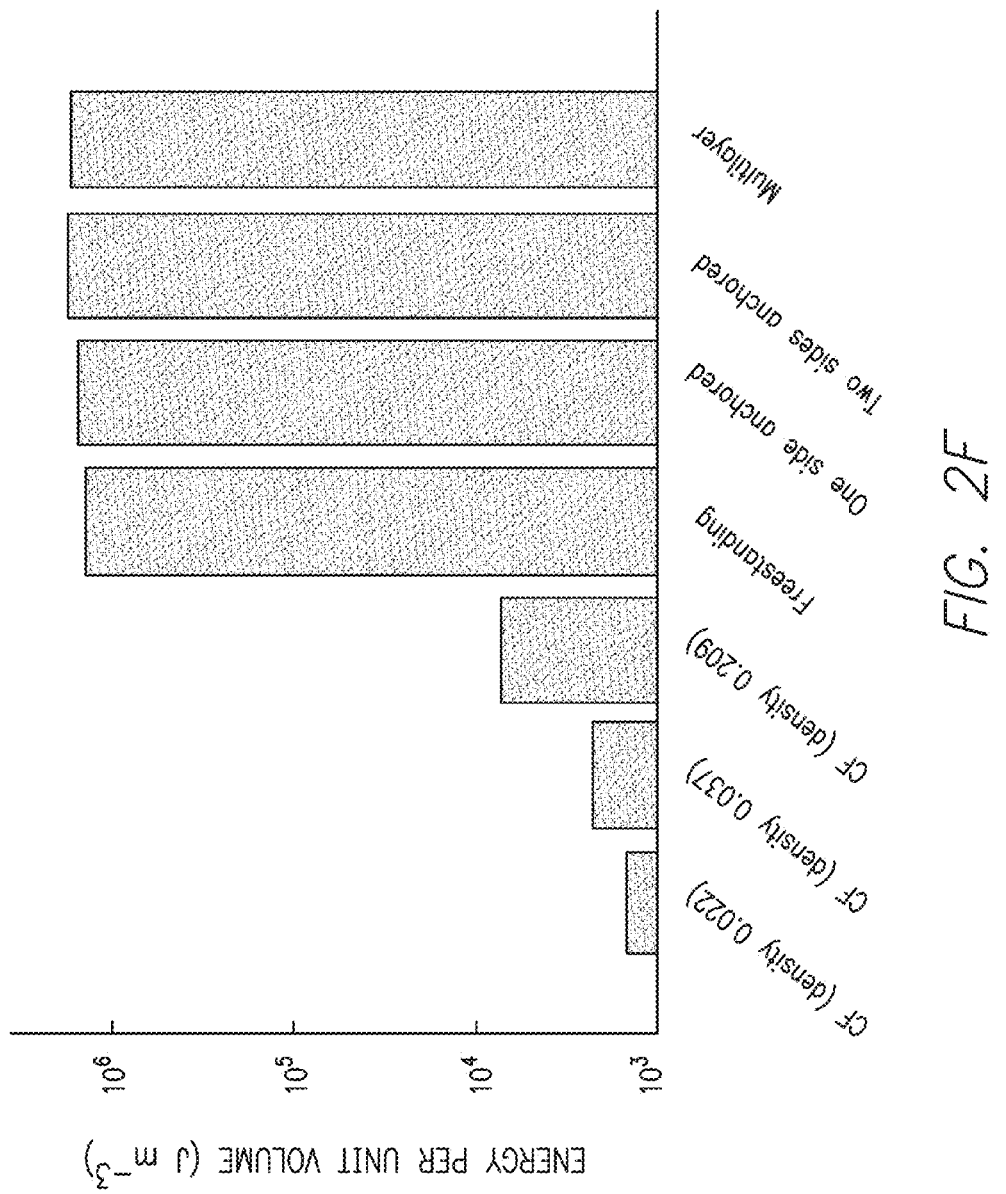
Figure 2G:
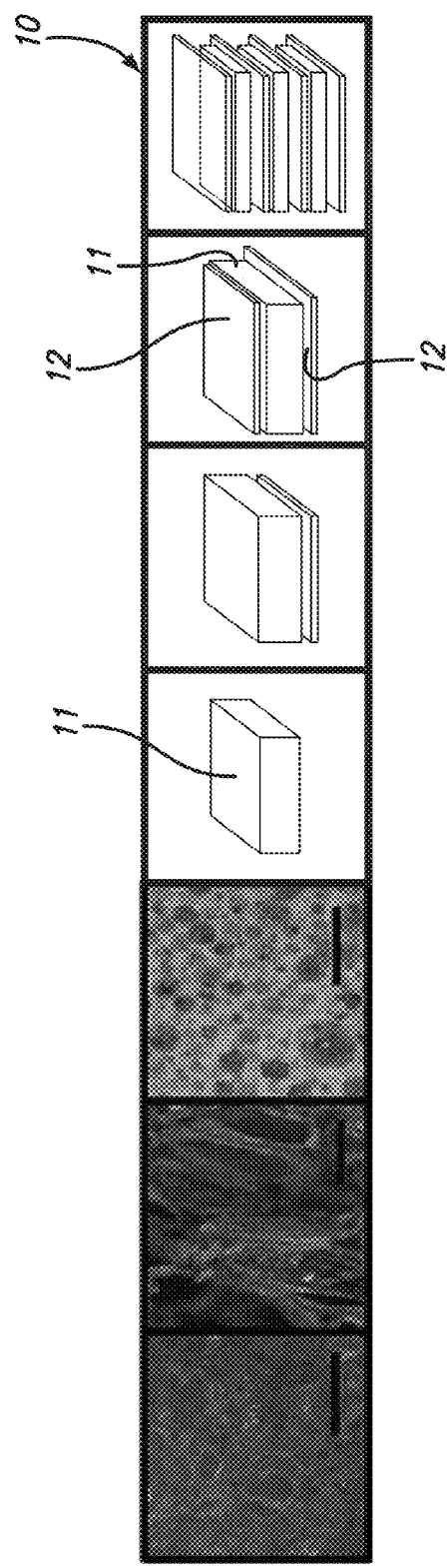
FIG. 2G shows optical images of commercial foams with three different densities, 0.022, 0.037, and 0.209 g/cm$^3$ from left to right, respectively (scale bar is 500 μm) and the schematic diagram of the CNT structures according to some embodiments of the present disclosure with and without polymer layer, from left to right, respectively.

In accordance with the present disclosure, the example embodiments of FIGS. 2E and 2F show maximum peak stress and energy absorbed per unit volume for commercial foams (CFs) and CNT structures. The peak stress, as shown in FIG. 2E, can be calculated at maximum (for example, at 0.8) strain. As shown in FIG. 2F, energy absorption can be compared as well, and is represented by the area of the hysteresis, which can be integrated to account for both loading and unloading behavior, since both the CNT-based structures and the CFs recover from deformation. The CNT-polymer structures can show a dramatic improvement of up to 3 orders of magnitude higher peak stress and energy absorption capability over CFs at comparable density. Example optical microscopic images of the analyzed foam samples and the schematic diagram of CNT structures are depicted in FIG. 2G.

Figure 3A:
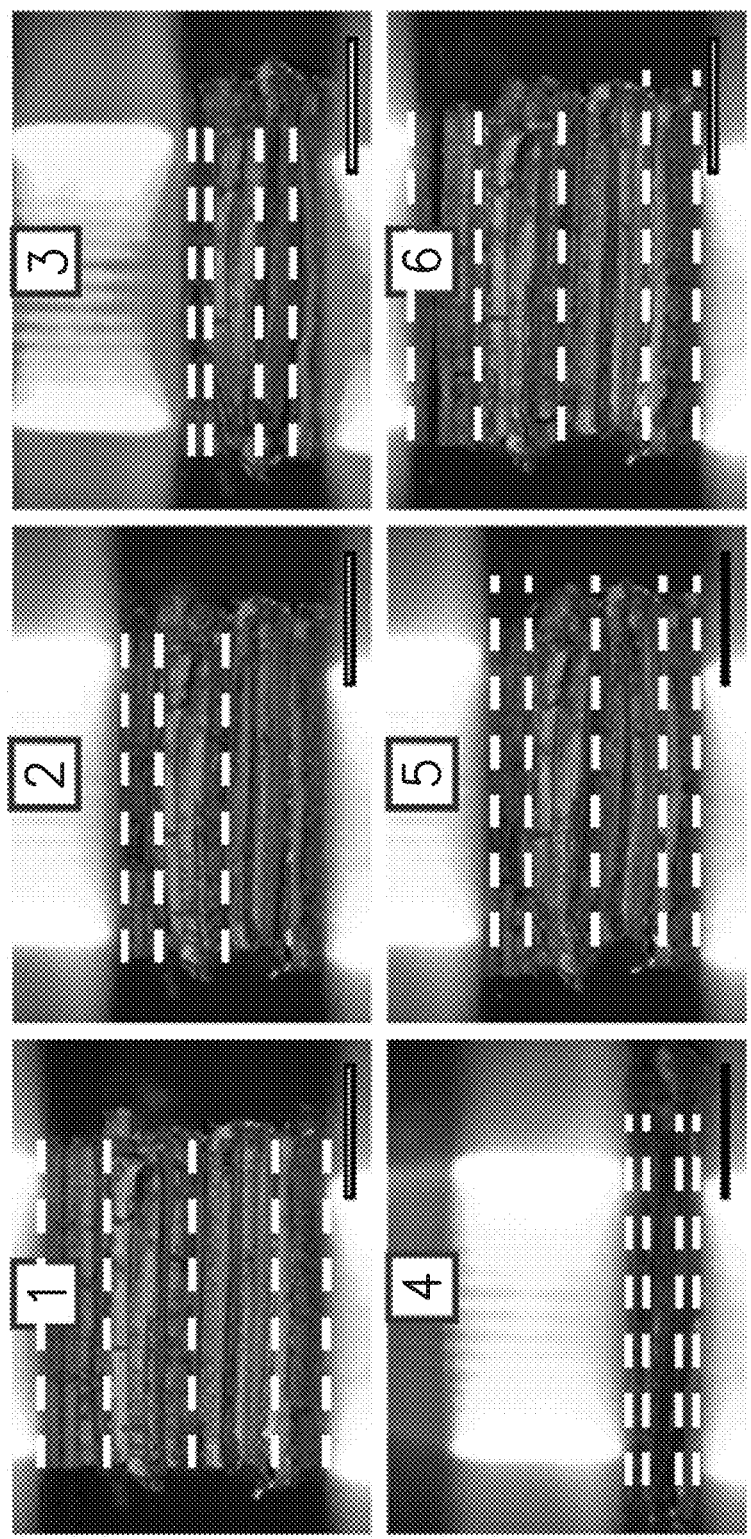
FIG. 3A shows digital snapshots of the deformed configuration of a multilayer structure with four layers of CNT arrays according to some embodiments of the present disclosure and corresponding to different strain levels.
Figure 3B:
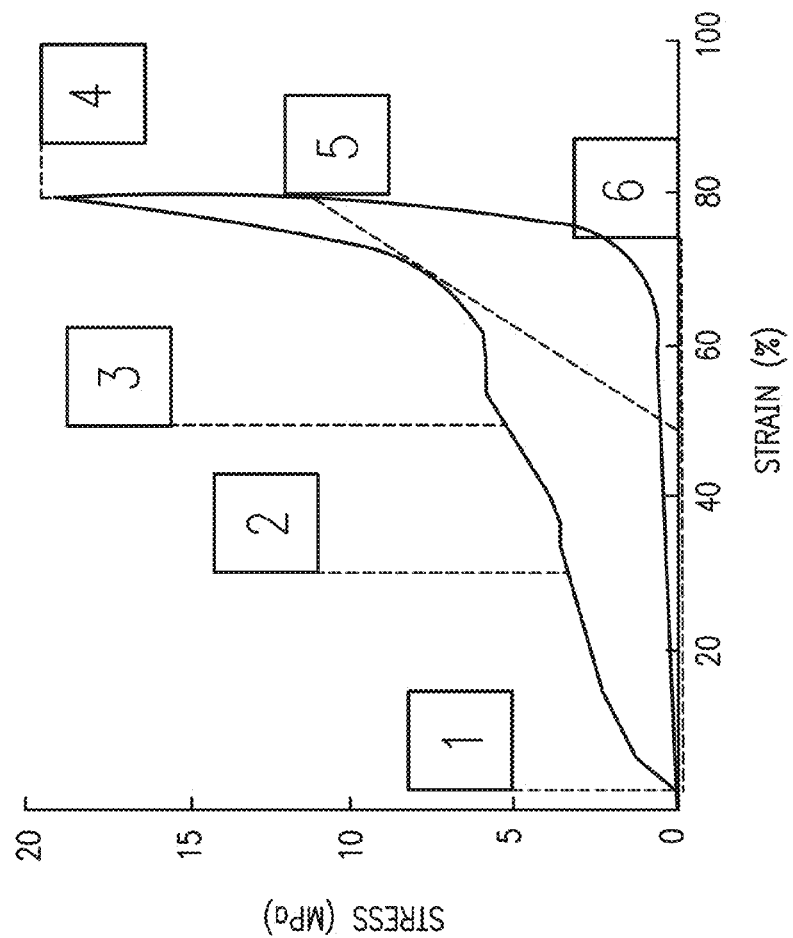
FIG. 3B shows a stress strain curve showing different strain levels corresponding to the snapshots in FIG. 3A.
Figure 3C:
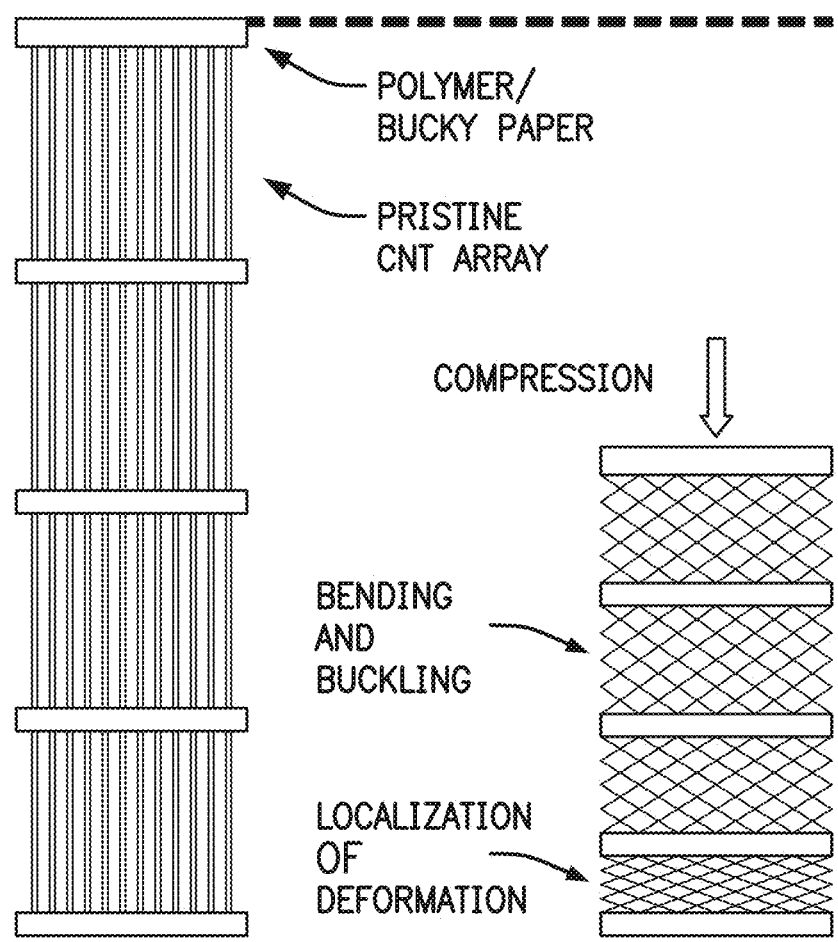
FIG. 3C shows a schematic diagram illustrating the localized deformation of the multilayer structure under compression of FIG. 3A.

According to several example embodiments of the present disclosure, FIG. 3A shows digital snapshots of the deformed configuration of a four-layer structure, FIG. 3B shows a compressive stress-strain curve with different strain levels corresponding to the snapshots in FIG. 3A, and FIG. 3C shows a schematic diagram illustrating the localized deformation of the four-layer structure under compression in FIG. 3A. According to some example embodiments of the present disclosure, for a detailed characterization of the deformation of multilayer structures, in situ optical measurements can be coupled to a mechanical testing system. As shown in the example embodiments of FIGS. 3A and 3B, an optical microscope equipped with a digital camera can allow the real-time observation of the deformation of multilayer structures during compression and recovery, as a function of the applied compressive strain.

In the example embodiments of FIGS. 3A-3C, an example single cycle compression test is shown with snapshots acquired at different strains during testing. The dashed lines in FIG. 3A are added to guide the eye for identifying the buckling and recovery response of the individual layers. The dashed lines in FIG. 3A can indicate the location of the polymer interlayers. For example, panel 1 in FIG. 3A shows a pristine structure before compression. The pristine structure of panel 1 in FIG. 3A is indicated by point 1 in FIG. 3B. The non-uniform gradual collapse of each layer at 30% strain is shown in panel 2 of FIG. 3A as well as in FIG. 3B. As shown in the example embodiments of FIGS. 3A and 3B, upon reaching 50% strain, all layers have begun to collapse (panel 3 in FIG. 3A, corresponding to point 3 in FIG. 3B), which can demonstrate the presence of strain localization. Consequently, in the example embodiment of FIG. 3B, at 0.8 strain, the layers show a homogeneous collapse at point 4. Points 5 and 6 of FIG. 3B show the nearly complete recovery of the structure as the strain returns to zero. A non-uniform recovery is shown in panel 5 of the example embodiment of FIG. 3A.

According to several example embodiments of the present disclosure, the localized deformation and sequential buckling/recovery of the layers observed during testing can be related to the graded stiffness in the microstructure and in the differences in CNT properties from one CNT layer to the next. Such variations can affect the mechanical properties of CNT arrays. Some examples of such cases can be found in references 10 and 22, each of which is incorporated herein by reference in its entirety. A schematic diagram explaining the above mentioned phenomenon is shown in the example embodiment of FIG. 3C. The localized deformation of the individual layers can be particularly relevant to the energy absorption of structures loaded dynamically, as shown in reference 23, incorporated herein by reference in its entirety.

Figure 4A:
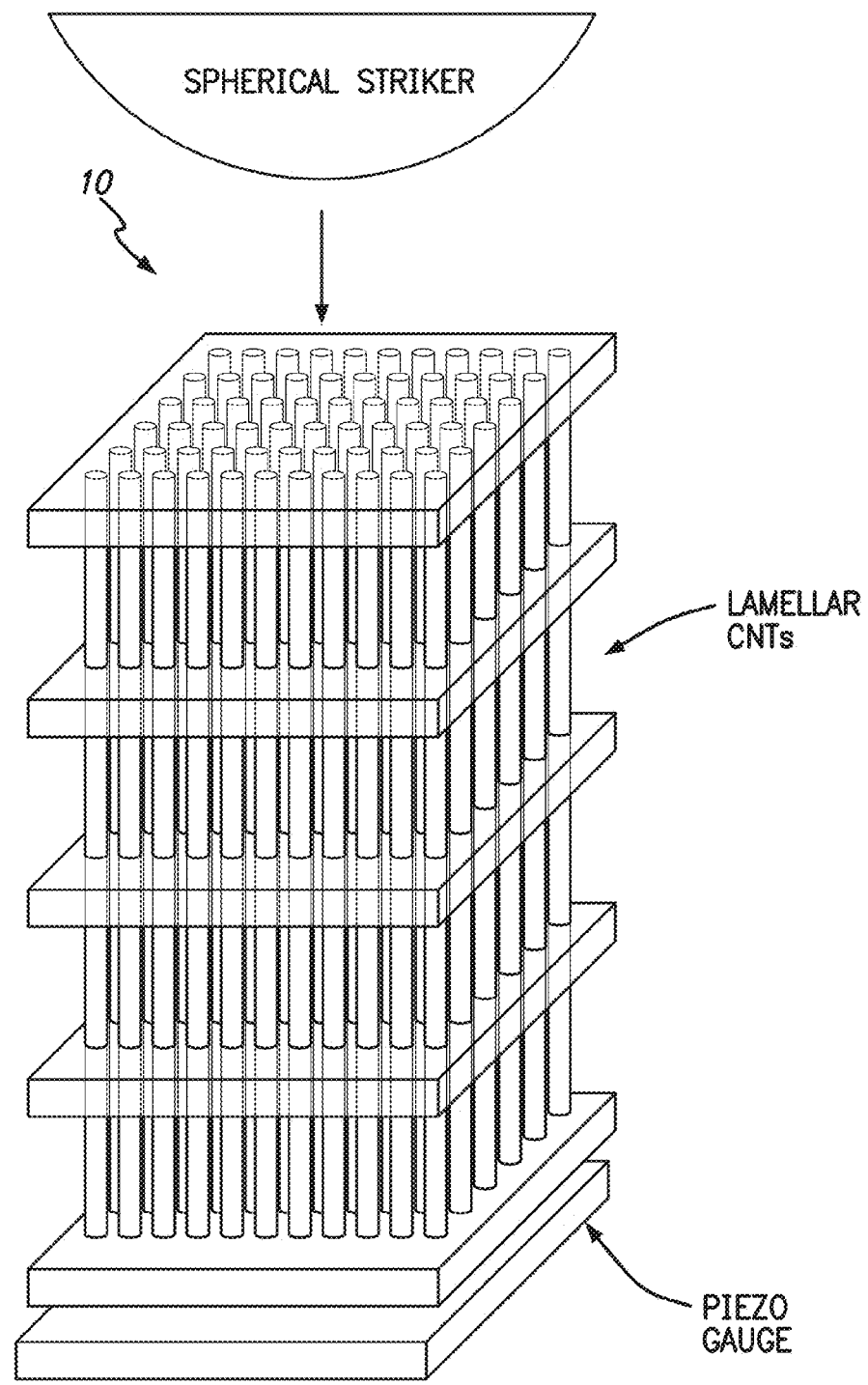
FIG. 4A shows a schematic diagram of a structure according to some embodiments of the present disclosure under an experimental setup for impact tests.
Figure 4B:
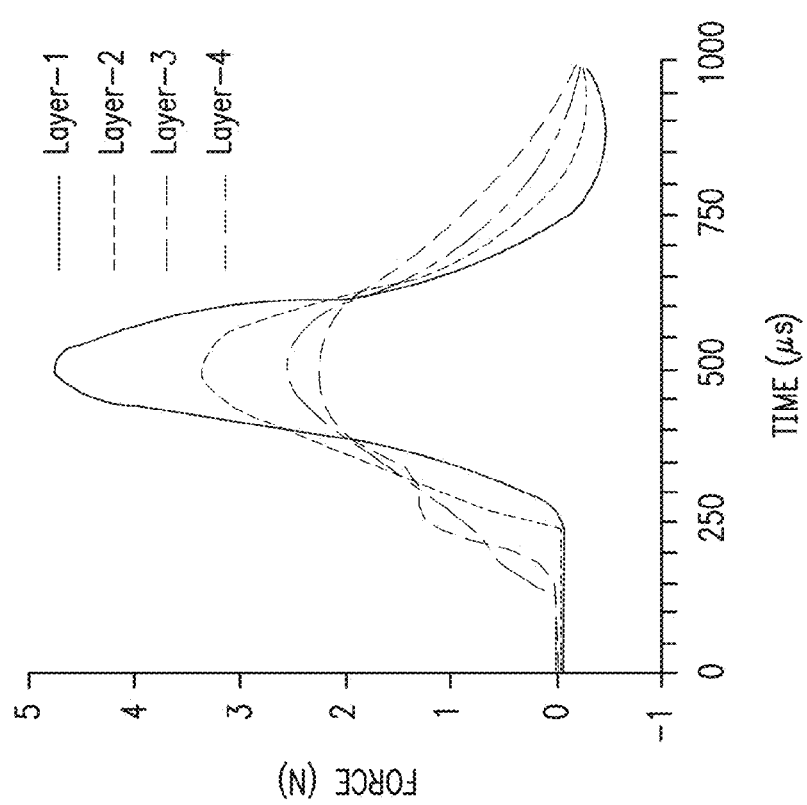
FIG. 4B shows force time plots obtained by impacting the CNT-polymer structures of FIG. 4A with a stainless steel bead at ~1.4 m s$^{-1}$.

According to some embodiments of the present disclosure, the dynamic response of the layered CNT polymer structures can be assessed by drop ball impact tests as shown in FIG. 4A. Some examples can be found, for example, in reference 24, incorporated herein by reference in its entirety. The force mitigation performance of different CNT structures can be evaluated by comparing the peak force and length of contact time between samples composed of, for example, one, two, three, and four layers of CNTs under the same loading conditions as shown in FIG. 4B. As shown in FIG. 4B, the four-layer structure showed improved force mitigation capability as compared to the single, double, and triple-layer materials. The peak force can be observed to decrease with increasing number of layers, while, at the same time, the contact duration can increase as well. The onset of the deformation in the different layers of the multilayer structure can be visible from the presence of "shoulders" in the force time response, which can indicate the sequential collapse of individual layers and the localization of deformation within selected sections of the material.

Figure 5A:
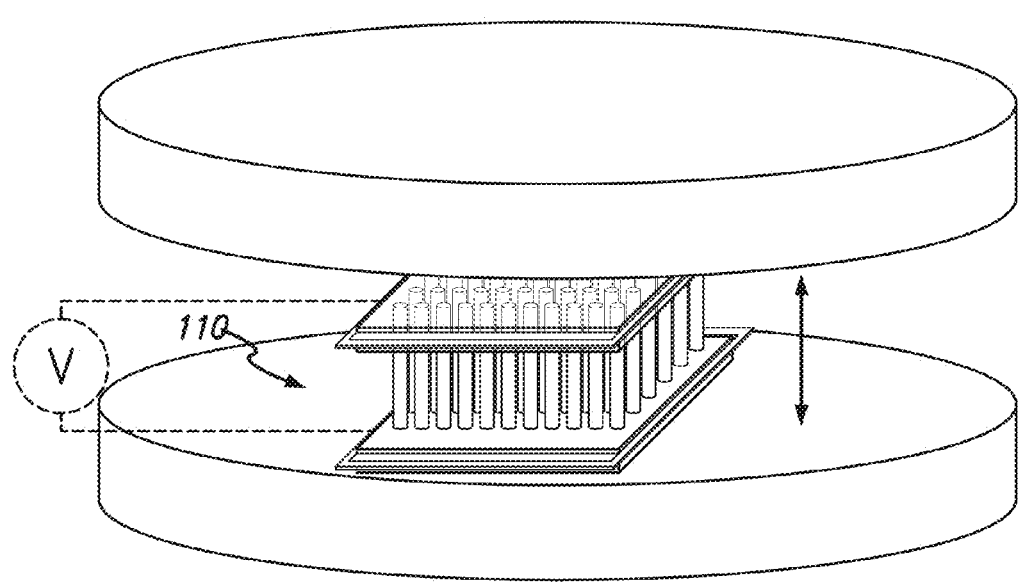
FIG. 5A shows a schematic diagram of a structure according to some embodiments of the present disclosure under experimental setup for in situ cyclic compression.
Figure 5B:
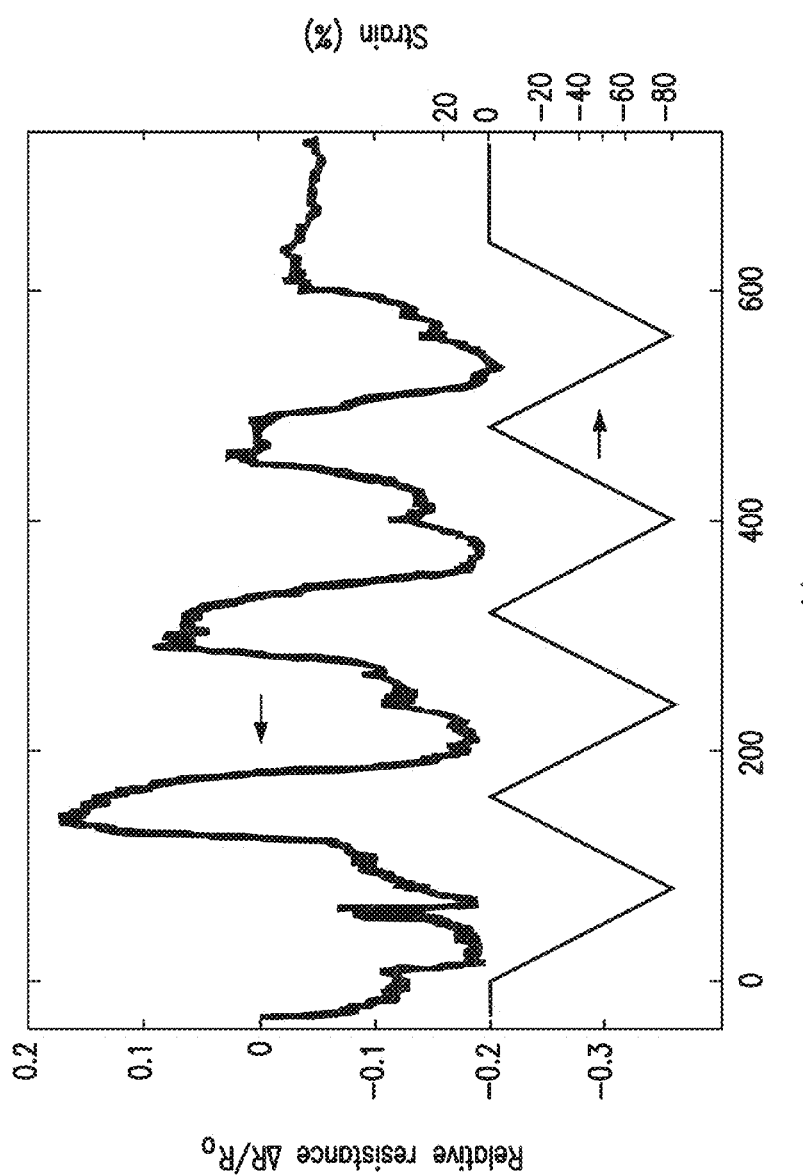
FIG. 5B shows compressive strain and fractional resistance change (ΔR/R) measured (in situ) during cyclic compression for the structure of FIG. 5A.

The deformation of the CNT arrays and the effects of residual strain after cyclic compression can be monitored via in situ and ex situ measurements of electrical resistance across each layer of the CNT polymer structures, as shown in the example embodiments of FIGS. 5A and 5B, assuming a constant contact resistance. As shown in the example embodiment of FIG. 5A, the measurement of electrical resistance during cyclic tests can reveal that materials composed of a single layer of CNTs can present a decrease in electrical resistance (in situ) during loading. Similarly, as shown in the example embodiment of FIG. 5B, the measurement of electrical resistance during cyclic tests can reveal that structures composed of a single layer of CNTs can present an increase with unloading. The observed variation in electrical resistance can be related to the structural reorganization of the individual CNTs within the array. This reorganization can result in an overlap of the electron states in adjacent CNT walls and the resulting increase in the accessible number of conduction channels. Some examples of such cases can be found, for example, in reference 25, incorporated herein by reference in its entirety.

Figure 5C:
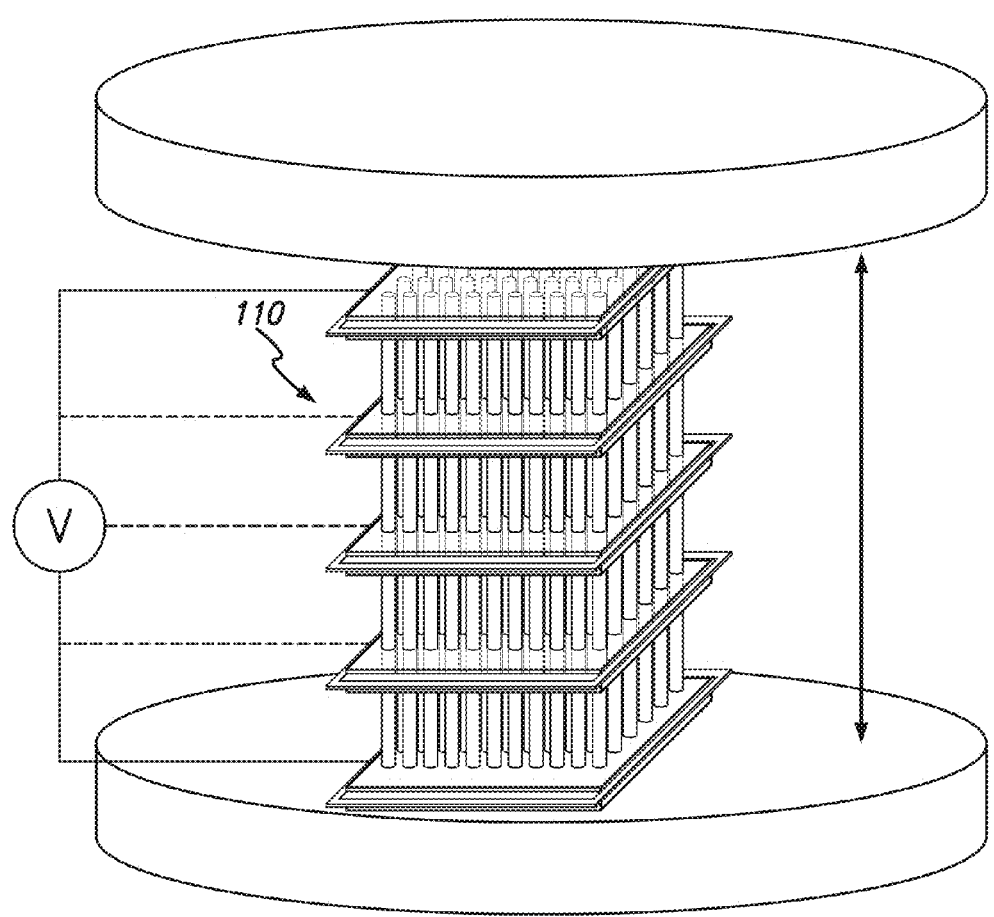
FIG. 5C shows a schematic diagram of a structure according to some embodiments of the present disclosure under experimental setup for electrical measurements.

According to several example embodiments of the present disclosure, the distance between adjacent CNTs can decrease when the CNTs bend in compression. The number of point contacts between CNTs can be increased and consequently can lower the resistance of the CNT arrays. In accordance with the present disclosure, the variation of resistance can be defined as $\Delta R/R_0$, where $\Delta R$ is the resistance change between the final and the pristine ($R_0$) cases, and can be observed to decrease gradually after each cycle. Moreover, a permanent decrease of the electrical resistance can be observed after the complete removal of the load, and this decrease can be attributed to the irreversible structural changes occurring in the CNT array structures. Ex situ electrical measurements can be performed on four-layer CNT structures and, for this measurement, the voltage can be fixed at, for example, 5 V and the current can be measured across each layer before and after the mechanical tests. Furthermore, measurements can be taken between the top layer (fixed electrode) and the successive layers (moving the electrode progressively from one layer to the next), as shown in the example schematic diagram of FIG. 5C.

Figure 5D:
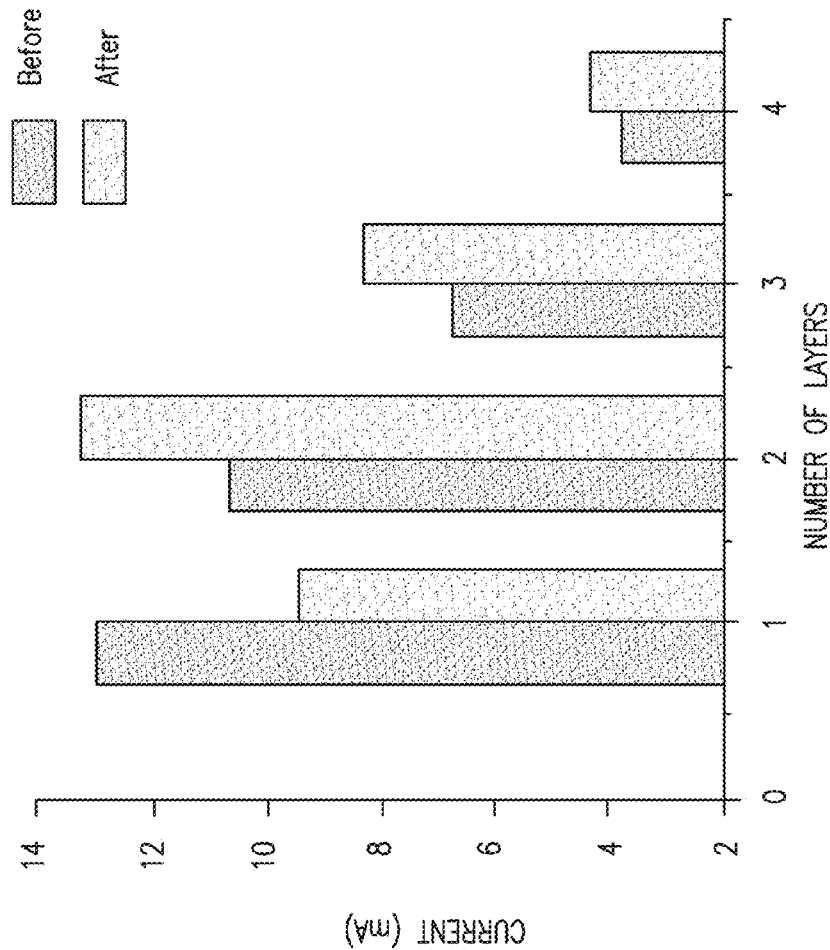
FIG. 5D shows ex situ electrical measurements performed after compressive testing of multilayer structure according to some embodiments of the present disclosure.

Moreover, the electrical measurements acquired after performing the mechanical tests can show a significant difference as compared to the measurements acquired from the pristine sample. As shown in the example embodiment of FIG. 5D, the measured change in the current as a result of deformation can be different in each layer of the structure, suggesting that the individual layers can deform differently from one another and can undergo different microstructural rearrangements. In the example embodiment of FIG. 5D, the current measured across the first layer can decrease, as opposed to the increase measured across the other layers. This result can suggest a localization of deformation in the first layer of the structure, in agreement with the optical image shown in FIG. 3A (panel 6). This effect can arise from the presence of some possible imperfections deriving from the fabrication process.

Figure 6:
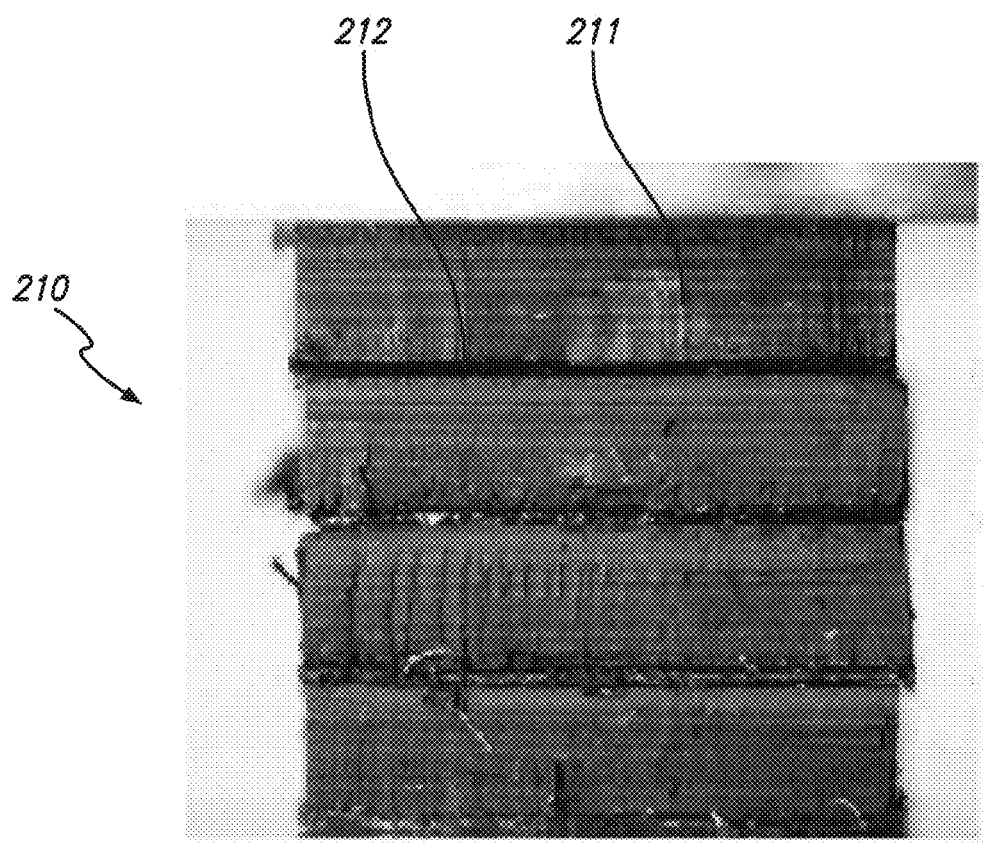
FIG. 6 shows respective foams according to some embodiments of the present disclosure.

According to some embodiments of the present disclosure, instead of the polymeric layers described in the previous paragraph, a process for making a structure of nominally-aligned arrays of carbon nanotubes (CNTs) can relate to fabrication and characterization of multilayer structures (see, for example, (210) in FIG. 6) with metal foils. According to further embodiments of the present disclosure, the mechanical response of a multilayer composite structure composed of alternating layers of aligned carbon nanotubes (see, for example, (11) in FIGS. 1A-1E) and metal foils under compression can be tested, where the metal foils can be copper foils with thin adhesive layers (see, for example, (211) and (212) in FIG. 6). A multilayer structure (see for example, (210) in FIG. 6) composed of alternating layers of vertically aligned multi-walled CNTs and copper tape, which comprises copper foil and a thin layer of adhesive on each side, can be obtained according to the following procedure. The CNTs can be grown as previously indicated by chemical vapor deposition (CVD) using ferrocene and toluene as precursors. The height of each CNT layer can be, for example, approximately 1.3 mm and the area can be approximately 25 mm$^2$. The average diameter of the as-grown CNTs can be, for example, 50 nm. Moreover, the multilayer structure can be constructed using a total of four CNT layers.

Moreover, similar multilayer structures can give superior response under impact when compared to a single CNT array.

In fact, multilayer specimens can be expected to provide superior damping performance in dynamic conditions as compared to their single layer counterparts. Multilayer structures of aligned CNTs are therefore interesting from a practical point of view. For example, a possible application of such multilayer structures can be as light-weight components in laminar composites for energy absorption and protective systems. The multilayer structures examined in some embodiments of the present disclosure can be constructed so that the copper interlayers between CNT arrays can have a minimal influence in the overall mechanical response of the system allowing for a clearer picture of the CNT mechanics. The understanding of these systems can enable future study of more complex structures in which aligned CNTs could be partially [see, for example, reference 26, incorporated herein by reference in its entirety] or fully [see, for example, reference 17, incorporated herein by reference in its entirety] embedded in various polymeric matrices, such as, for example, the multilayer structure including a layer of CNTs sandwiched between two layers of polymeric layers as indicated in the previous sections.

The examples set forth above are provided to give those of ordinary skill in the art a complete disclosure and description of how to make and use the embodiments of the disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF CITED REFERENCES

[1] Maghrebi M, Khodadadi A A, Mortazavi Y, Sane A, Rahimi M, Shirazi Y, et al. Acetic acid effects on enhancement of growth rate and reduction of amorphous carbon deposition on CNT arrays along a growth window in a floating catalyst reactor. Applied Physics A: Materials Science & Processing 2009; 97(2):417-24.

[2] Cao A Y, et al. Super-compressible foam like carbon nanotube films, Science 2005; 310(5752):1307-10.

[3] U.S. Pat. No. 7,727,624.

[4] Misra A, et al. "Synthesis and characterization of carbon nanotube-polymer multilayer structures", ACS Nano 2011; 5(10):7713-7721.

[5] Misra, A.; Greer, J. R.; Daraio, C. Strain rate effects in the mechanical response of polymer-anchored carbon nanotube foams. *Adv. Mater.* 2009, 21, 334-338.

[6] Sansom, E. B.; Rinderknecht, D.; Gharib, M. Controlled Partial Embedding of Carbon Nanotubes within Flexible Transparent Layers. *Nanotechnology* 2008, 19, 035302-035308.

[7] Ci, L.; Suhr, J.; Pushparaj, V.; Zhang, X.; Ajayan, P. M. Continuous Carbon Nanotube Reinforced Composites. *Nano Lett.* 2008, 8, 2762-2766.

[8] Suhr, J.; Koratkar, N.; Keblinski, P.; Ajayan, P. M. Viscoelasticity in Carbon Nanotube Composites. Nat. Mater. 2005, 4, 134-137.

[9] Zhang, Q.; Zhao, M.; Liu, Y.; Cao, A.; Qian, W.; Lu, Y.; Wei, F. Energy-Absorbing Hybrid Composites Based on Alternate Carbon-Nanotube and Inorganic Layers. Adv. Mater. 2009, 21, 2876-2880.

[10] Misra A, Raney J R, Craig A E, and Daraio C, Effect of density variation and non-covalent functionalization on the compressive behavior of carbon nanotube arrays. *Nanotechnol.* 22, 425705 (2011).

[11] Naraghi, M.; Filleter, T.; Moraysky, A.; Locascio, M.; Loutfy, R. O.; Espinosa, H. D. A Multiscale Study of High Performance Double-Walled Nanotube-Polymer Fibers. ACS Nano 2010, 4, 6463-6476.

[12] Raney, J. R.; Fraternali, F.; Amendola, A.; Daraio, C. Modeling and in Situ Identification of Material Parameters for Layered Structures Based on Carbon Nanotube Arrays. Compos. Struct. 2011, 93, 3013-3018.

[13] Gama, B. A.; Bogetti, T. A.; Fink, B. K.; Yu, C-J; Claar, D.; Elifert, H. H.; Gillepse, J. W. Aluminum Foam Integral Armor: A New Dimension in Armor Design. Compos. Struct. 2001, 52, 381-395.

[14] Ajayan, P. M.; Schadler, L. S.; Giannaris, C.; Rubio, A. Single Walled Carbon Nanotube: Polymer Composites Strength and Weakness. Adv. Mater. 2000, 12, 750-753.

[15] Liu, M.; Sun, J.; Sun, Y.; Bock, C.; Chen, Q. Thickness Dependent Mechanical Properties of Polydimethyl Siloxane Membranes. J. Micromech. Microeng. 2009, 19, 035028-035031.

[16] Zhang, M.; Atkinson, K. R.; Ray, H. Baughman. Multifunc-tional Carbon Nanotube Yarns by Downsizing an Ancient Technology. Science 2004, 306, 1358-1361.

[17] Garcia E J, Hart A J, Wardle B L, Slocum A H. Fabrication and nanocompression testing of aligned carbon-nanotube-polymer nanocomposites. Adv Mater 2007; 19(16):2151-6.

[18] Gibson, L. J.; Ashby, M. F. Cellular Solids: Structure & Properties, 3rd ed.; New York, 1988; Pergamon Press.

[19] Barker, M. K.; Seedhom, B. B. The Relationship of the Compressive Modulus of Articular Cartilage with its Deformation Response to Cyclic Loading: Does Cartilage Optimize its Modulus so as to Minimize the Strains Arising in it Due to the Prevalent Loading Regime? Rhumatology 2001, 40, 274-284.

[20] Loret, B.; Simoes; Fernando, M. F. Articular Cartilage with Intra- and Extrafibrillar Waters: a Chemo-Mechanical. Mech. Mater. 2004, 36, 515-541.

[21] Yang, J.; Chiou, R.; Ruprecht, A.; Vicario, J.; MacPhailL, A.; Rams, T. E. A New Device for Measuring Density of Jaw Bones. Dentomaxillofacial Radiol. 2002, 31, 313-316.

[22] Raney, J. R.; Misra, A.; Daraio., C. Tailoring the Microstructure and Mechanical Properties of Arrays of Aligned Multiwall Carbon Nanotubes by Utilizing Different Hydrogen Concentrations during Synthesis. Carbon 2011, 49, 3631-3638.

[23] Ajdari, A.; Nayeb-Hashemi, H.; Vaziri, A. Dynamic Crushing and Energy Absorption of Regular, Irregular and Functionally Graded Cellular Structures. Int. J. Solids Struct. 2011, 48, 506-516.

[24] Daraio, C.; Nesterenko, V. F.; Jin, S. Highly Nonlinear Contact Interaction and Dynamic Energy Dissipation by Forest of Carbon Nanotubes. Appl. Phys. Lett. 2004, 85, 5724-5726.

[25] Pushparaj, V. L.; Ci, L.; Sreekala, S.; Kumar, A.; Kesapragada, S.; Gall, D.; Nalamasu, 0.; Ajayan, P. M.; Shur, J. Effects of Compressive Strains on Electrical Conductivities of a Macroscale Carbon Nanotube Block. Appl. Phys. Lett. 2007, 91, 153116-153118.

[26] Misra A, Greer J R, Daraio C. Strain rate effects in the mechanical response of polymer-anchored carbon nanotube foams. Adv Mater 2009; 21(3):334-8.

The invention claimed is:

1. A method for making a multilayer foam structure of nominally-aligned carbon nanotubes (CNTs), the method comprising:

synthesizing a layer of CNTs;

sandwiching the layer of CNTs between two polymeric layers; and sequentially repeating the sandwiching of the layer of CNTs between the two polymeric layers to obtain a plurality of alternating layers of CNTs and polymeric layers.

2. The method of claim 1, wherein synthesizing the layer of CNTs comprises growing the CNTs on a substrate, wherein after the growing, the layer of CNTs is partially anchored in an interlayer in the polymeric layers.

3. The method of claim 1, wherein the polymeric layers are polydimethylsiloxane (PDMS) layers.

4. The method of claim 1, wherein synthesizing the layer of CNTs comprises growing the CNTs on thermally oxidized silicon by chemical vapor deposition, before sandwiching the layer of CNTs between two polymeric layers.

5. The method of claim 1, wherein sandwiching the layer of CNTs between two polymeric layers comprises embedding end segments of the carbon nanotubes in the two polymeric layers via a substrate transfer method.

6. The method of claim 1, wherein each polymeric layer is obtained by mixing a polymeric substance with a curing agent and spin-coating a mixture of polymeric substance and curing agent on a slide.

7. A method for making a multilayer foam structure of nominally-aligned carbon nanotubes (CNTs), the method comprising:

synthesizing a layer of CNTs;

sandwiching the layer of CNTs between two polymeric layers; and comprising conferring electric conductivity properties to CNTs structure by providing a conducting film of entangled CNTs or buckypaper (BP) within or to each of the polymeric layers.

8. The method of claim 7, wherein the conducting film of entangled CNTs is individually sandwiched within adjacent polymeric layers.

9. A method for making a foam structure of nominally-aligned carbon nanotubes (CNTs), the method comprising:
synthesizing a layer of CNTs;
overlapping a first side of the layer of CNTs with a first polymeric layer and overlapping a second side of the layer of CNTs with a second polymeric layer to obtain a multilayer structure of alternating polymeric layers and a layer of CNTs; and
stacking a plurality of said multilayer structures, thus making the foam structure.

10. The method of claim 9, wherein the polymeric layer is a polydimethylsiloxane (PDMS) layer.

* * * * *